United States Patent

Kawai et al.

[11] Patent Number: 5,897,736
[45] Date of Patent: Apr. 27, 1999

[54] METHOD OF ATTACHING A NONMETALLIC CUTTER TO A CARTON

[75] Inventors: Takahiro Kawai; Atsushi Maruyama; Hiroshi Sano; Mineo Mukai, all of Tokyo, Japan

[73] Assignee: Dai Nippon Printing Co., Ltd., Tokyo, Japan

[21] Appl. No.: 08/746,317

[22] Filed: Nov. 12, 1996

Related U.S. Application Data

[62] Division of application No. 08/318,530, Oct. 5, 1994, abandoned, which is a continuation of application No. 08/040,177, Mar. 29, 1993, abandoned.

[30] Foreign Application Priority Data

| May 8, 1992 | [JP] | Japan | 4-141936 |
| Jul. 9, 1992 | [JP] | Japan | 4-205943 |
| Dec. 4, 1992 | [JP] | Japan | 4-350931 |
| Dec. 25, 1992 | [JP] | Japan | 4-359039 |

[51] Int. Cl.$^6$ ............................ B32B 31/00; B31B 7/14
[52] U.S. Cl. ............................ 156/261; 156/269; 156/518; 156/519; 156/530; 493/86
[58] Field of Search ............................ 156/521, 520, 156/530, 518, 515, 251, 261, 519, 528, 269; 493/78, 347, 331, 334, 335, 382, 86, 378, 73, 74, 75, 76, 77, 56, 84; 225/43, 48, 49, 91

[56] References Cited

U.S. PATENT DOCUMENTS

| 1,843,429 | 2/1932 | Marcalus | 493/86 |
| 2,072,875 | 3/1937 | Gray | 156/514 |
| 3,886,033 | 5/1975 | MacDonald et al. | 156/522 |
| 4,399,935 | 8/1983 | Nelder | 225/49 |
| 4,967,911 | 11/1990 | Lo Duca | 206/626 |
| 5,135,784 | 8/1992 | Okumura | 428/34.2 |
| 5,226,571 | 7/1993 | Eastwood et al. | 225/49 |

*Primary Examiner*—David A. Simmons
*Assistant Examiner*—Linda L. Gray
*Attorney, Agent, or Firm*—Flynn, Thiel, Boutell & Tanis, P.C.

[57] ABSTRACT

A method of attaching a cutter to a carton includes the steps of feeding intermittently a nonmetallic sheet by a feeding device toward upper and lower molds, one of which is vertically movable, punching the nonmetallic sheet by the molds to form the cutter, conveying and setting cartons one by one by a conveying device, sucking and holding the cutter on the movable mold, and pressing the cutter to the carton which is adhered thereto by an adhesive paste applied to the cutter. The nonmetallic sheet has an adhesive paste on one side and a removable sheet on the paste which is peeled away prior to punching.

16 Claims, 23 Drawing Sheets

F I G. 7
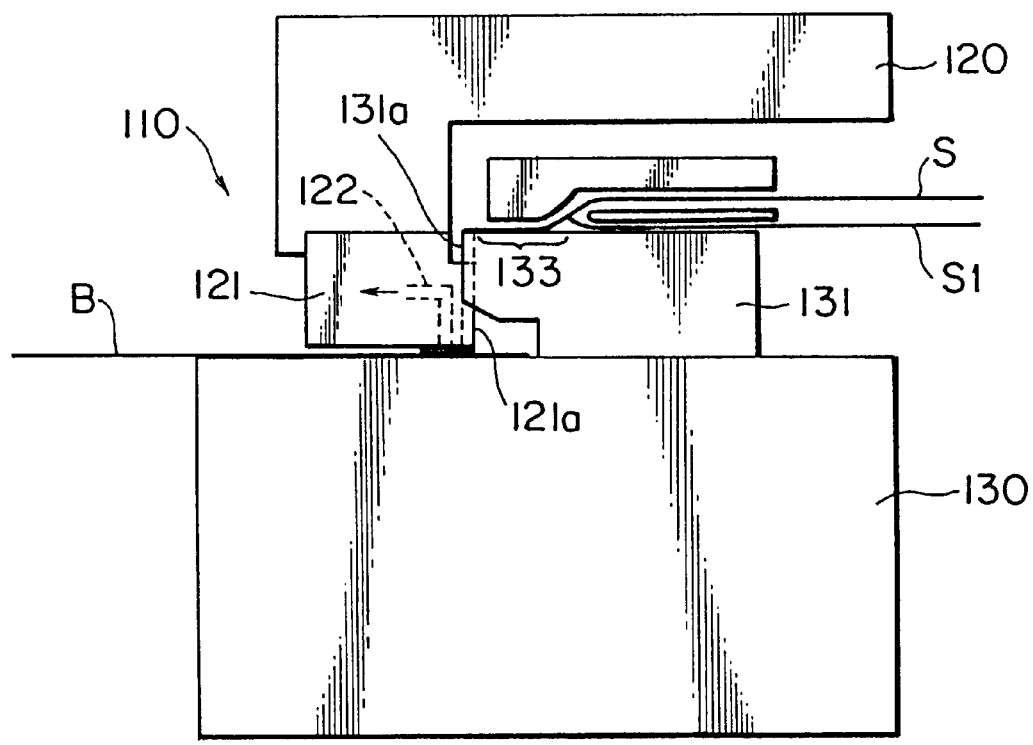

METHOD OF ATTACHING A NONMETALLIC CUTTER TO A CARTON

This application is a division of Ser. No. 08/318 530, filed Oct. 5, 1994, now abandoned, which is a continuation of Ser. No. 08/040 177, filed Mar. 29, 1993, now abandoned.

BACKGROUND OF THE INVENTION

1. Field of the Invention

The present invention relates to a nonmetallic cutter (hereinafter referred to as a cutter) for cutting a wrap web and a carton for containing the wrap web therein (hereinafter referred to as a carton) and having the same cutter attached thereto, particularly to a method of and an apparatus for manufacturing the same cutter and attaching the same cutter to the carton.

2. Prior Art

There have been widely used a metallic cutter which is attached to a rectangular parallelepiped carton at a given position which contains therein a wound wrap web in a wound state such as an aluminum foil, a resin film, etc. wherein the wrap web is drawn out from the carton and is cut by the same cutter.

In such a conventional carton, there is an advantage that the cutter per se has a good sharpness but there are such disadvantages or problems that the process for crimping the cutter to the same carton is troublesome and a finger tip, etc. are liable to be wounded when the wrap web is drawn out and cut. Furthermore, there is another problem that the metallic cutter remains unburnt when the carton is incinerated, which injures an incinerator. Accordingly, it is necessary to separate the cutter from the carton when the latter is incinerated in the environmental point of view. Therefore, it is desired that the conventional metallic cutter should be changed to a flammable cutter.

SUMMARY OF THE INVENTION

The present invention has been made in view of the problems of the conventional cutter.

It is a first object of the present invention to provide a cutter which can be easily attached to a carton and has a good sharpness and to provide a carton having the same cutter attached thereto through which the wrap web is drawn out and cut with safety and which is excellent in incineration.

It is a second object of the present invention to provide a method of and an apparatus for manufacturing a cutter and attaching the same cutter to the carton before the latter is assembled with high productivity.

It is a third object of the present invention to provide a method of and an apparatus for manufacturing a cutter having sharp edges and attaching the so manufactured cutter to a carton with high productivity.

According to the first aspect of the present invention, the cutter has edges which is formed by punching a hard paper at one side thereof. The hard paper is one of a vulcanized fiber, a parchment paper, a tracing paper, a converted paper formed by pasting one tracing paper to another tracing paper and a converted paper which is formed by pasting the tracing paper to the hard paper. In the wrap web containing carton wherein the wrap web wound in roll shape is drawn out from an opening of a carton body and cut, the cutter is characterized in being attached to the carton boy at the position where the wrap web is cut.

One of methods for manufacturing and attaching the cutter according to the second aspect of the present invention is characterized in comprising the steps of intermittently feeding a nonmetallic sheet (hereinafter referred to as a sheet) toward upper and lower molds, punching the sheet in the shape of the cutter between the upper and lower molds, pressing the cutter to the carton which is conveyed and set one by one at a given position by way of an adhesive surface of the sheet while the cutter is sucked and held by the vertically movable upper or lower mold and attaching the cutter to the carton.

There are two types of apparatus for carrying out the method of attaching the cutter. One comprises a vertically movable upper mold provided with an upper blade having edges and a suction means for sucking and holding a severed cutter, a fixed lower mold provided with a lower blade having edges, a feeding means for intermittently feeding a sheet onto said lower mold and a conveying means for conveying and setting sequentially the cartons one by one to the bottom dead center of said upper mold. The other comprises a vertically movable lower mold provided with a lower blade having edges and a suction means for sucking and holding a severed cutter, a fixed upper mold provided with an upper blade having edges, a feeding means for intermittently feeding a sheet onto said lower mold and a conveying means for conveying and setting sequentially the cartons one by one to the top dead center of said lower mold. In any types of the apparatus, when the sheet to which the adhesive paste is applied, is used, a peeling means of a separate paper is disposed. In case of using the sheet to which the adhesive paste is not applied, there is provided a pasting device for applying the adhesive paste to the carton at the given position thereof.

The method for manufacturing the cutter having sharp edges (hereinafter referred to as a cutter manufacturing method) according to the third aspect of the present invention is characterized in comprising the steps of supplying a sheet between a cutter roller having a cutter blade and a receiving roller having a flat receiving surface for receiving the cutter blade in which the cutter blade protruding radially outwardly from the cutter roller and having edges shape of which is same, when viewed toward the edges, as that of edges of a cutter to be manufactured, when viewed on the plane thereof, synchronously rotating the cutter roller and the receiving roller so that the cutter blade of said cutter roller and the receiving surface of the receiving roller move in the same speed and cutting in the sheet which is supported by said receiving surface to thereby sever the sheet in the shape of the cutter while the sheet is conveyed at the same speed of the tip end of the cutter blade. The cutter blade of the cutter roller may be attached to the cutter roller so as to extend in the substantially axial direction or in the circumferential direction.

The apparatus for manufacturing the cutter and attaching the same to the carton (hereinafter referred to as a cutter manufacturing and attaching apparatus) which embodies the cutter manufacturing method according to the fourth aspect of the present invention is characterized in comprising a conveying device for conveying a carton to which a cutter is attached, a pasting device for applying an adhesive paste to the carton at a given position thereof, a cutter manufacturing and pasting device for severing a sheet continuously fed thereto so as to form a cutter and pasting the severed cutter to a pasting portion of the carton, a cutter roller having a cutter blade which extends substantially axially thereof so as to protrude radially outwardly from the cutter roller, in which the cutter blade having edges shape of which is same, when viewed toward the edges, as that of edges of the cutter to be manufactured, when viewed on the plane thereof and a suction roller having a flat surface for receiving the cutter blade and suction holes for sucking and holding the severed cutter, wherein the suction roller is arranged in parallel with and rotated synchronously with said cutter roller and the suction roller is positioned at the position where the cutter which is sucked and held by said suction holes is pasted to the carton which is conveyed by said conveying device.

There are following three cutter manufacturing device in the cutter manufacturing and pasting apparatus according to the fourth embodiment of the present invention.

The first device comprises a cutter cylinder having a cutter blade provided on a peripheral surface thereof and extending in longitudinal direction thereof, a rotary die cutter having a receiving cylinder provided on a peripheral surface thereof for receiving the cutter blade and a sheet conveying and inverting device for feeding a sheet between the cutter cylinder and the receiving cylinder of the rotary die cutter at the speed synchronous with that of the cutter blade and pulling back the sheet after the tip portion thereof is severed.

In the second device, the sheet conveying and inverting device of the first device comprises a conveying device having a pair of feeding cylinders, the cylinders each having a cylindrical feeding surface on the outer peripheral surface at the partial region thereof in the circumferential direction thereof wherein the sheet is fed between the cutter cylinder and the receiving cylinder of the rotary die cutter at the speed synchronous with that of the cutter blade and an inverting device for pulling back the sheet after the tip position thereof is severed.

The third device comprises the cutter cylinder and receiving cylinder of the rotary die cutter are arranged so as to leave a microscopic clearance between the tip end of the cutter blade and the receiving table, wherein the receiving cylinder has a suction means for sucking and holding the severed sheet and wherein the apparatus further comprises a stopper provided at the passage of the sheet which is fed to the rotary die cutter for stopping the sheet temporarily when the sheet is severed by the rotary die cutter.

BRIEF DESCRIPTION OF THE DRAWINGS

FIG. 7 is a schematic side view showing the main portion of the apparatus of FIG. 6 which is viewed at the position of a bottom dead center of the upper mold.

PREFERRED EMBODIMENT OF THE INVENTION

First Embodiment (FIGS. 1 to 5)

Figure 1:
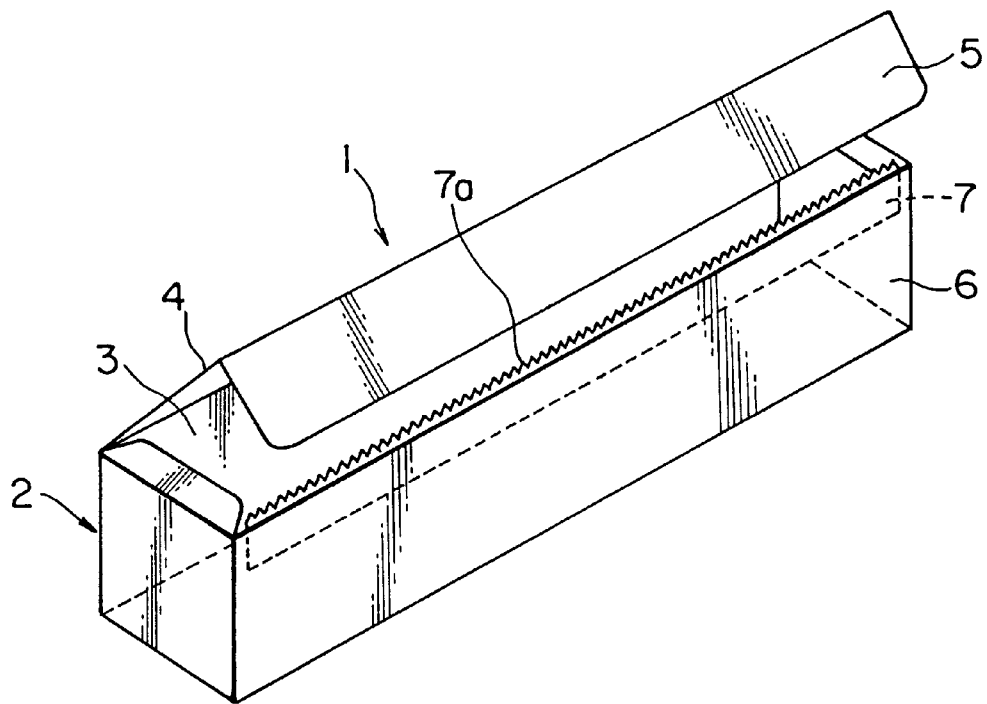
FIG. 1 is a perspective view of a wrap web containing carton according to a first embodiment of the present invention.

A first embodiment of the present invention will be described with reference to FIGS. 1 and 5.

A carton 1 comprises a carton body 2, an opening 3 provided at the upper portion of the body 2 through which a wrap web wound in a roll-shape in the container 1 is drawn, a cover body 4 which continues from the rear wall of the carton body 2 for opening and closing the opening 3 and a cover flap 5 provided at the tip end of the cover body 4. A cutter 7 is attached to the inner upper portion of a front wall 6 by an adhesive or a pressure sensitive adhesive such as a hot melt, etc.

Figure 2:
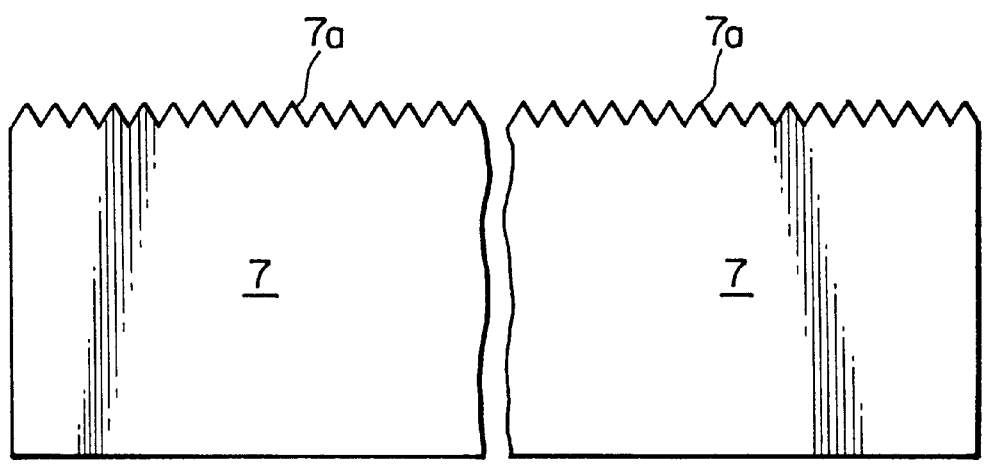
FIG. 2 is an enlarged view of a part of a cutter according to the first embodiment of the present invention.

The cutter 7 comprises a hard paper such as a vulcanized fiber or a parchment paper which is 0.3 mm in the thickness and 90 to 120 in Rockwell hardness. The cutter 7 has edges at the upper end thereof and is formed by punching the hard paper in the shape as illustrated in FIG. 2 by a punching machine. The cutter 7 is attached to the carton body 2 in the manner that the edges 7a of the cutter 7 protrude from the substantially entire length of the upper tip end of the front wall 6. When the hard paper is continuously punched, the edges 7a of the cutter 7 will be formed at the lower end of the hard paper 7.

The vulcanized fiber is formed by a known method comprising the steps of soaking a fiber sheet formed of a wood fiber or a cotton into a zinc chloride solution and laminating the fiber sheet, removing the zinc chloride solution serving as the gelatinizing agent by washing the same sufficiently drying and squeezing the thus laminated fiber sheet. The vulcanized fiber may be formed by coating resin such as a urethane resin onto the fiber sheet so as to give a strength thereto. The parchment paper is formed by a known method comprising the steps of processing the paper made of a cotton fiber or a wood chemical pulp by a sulfuric acid, washing the so formed paper entirely by water and thereafter drying the same paper. These hard papers are fine in the texture and excellent in the hardness and do not cause any problem of the safety against a foodstuff, etc.

The cutter 7 is formed of the hard paper having a given thickness and Rockwell hardness ranging from 90 to 120. If the Rockwell hardness is less than 90, the paper is too soft whereas if it is greater than 120, it causes the problem in the safety point of view. It is preferable to use the hard paper having the Rockwell hardness ranging from 100 to 110 for a practical use. The thickness of the hard paper is preferable to range from 0.2 to 0.5 mm. If the thickness is less than 0.2 mm, the strength of the cutter 7 is insufficient while if it is greater than 0.5 mm, the sharpness of the cutter is deteriorated. The cutter 7 is attached to the carton 1 by such means as an emulsion adhesive pasting, a pressure sensitive adhesive pasting, a hot melt pasting, a reverse side tacking process pasting.

Figure 3:
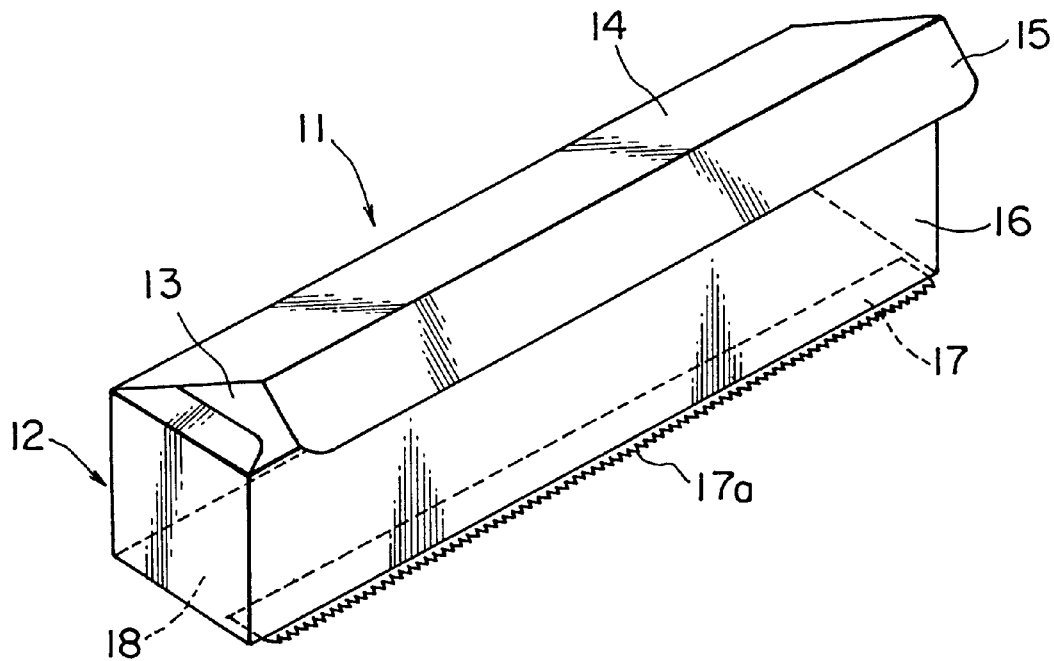
FIG. 3 is a perspective view of a wrap web containing carton according to a first modified example of the first embodiment of the present invention.

A first modified example of the first embodiment will be described with reference to FIG. 3 which is a perspective view of a carton 11. The carton 11 has a cutter 17 which is attached to a bottom surface 18 thereof at the side of a front wall 16 wherein edges 17a of the cutter 17 protrude from the entire length of the lower end of the front wall 16. The cutter 17 is formed by punching the hard paper such as the vulcanized fiber or the parchment paper having the thickness of 0.3 mm and the Rockwell hardness of 90 to 100 in the same way as the embodiment of FIG. 1. The wrap web can be cut as follows. The end of the wrap web is gripped and drawn out by one hand from an upper opening 13 of a carton body 12 while a cover body 14 is closed by the other hand and the wrap web is held by the other hand between the cover body 14 and a cover flap 15 and successively the end of the wrap web is further drawn out by one hand while the carton 11 is rotated by the other hand so that the wrap web is cut by the edges 17a of the cutter 17.

In the carton 11 of the first modifies example of the first embodiment, there is an advantage that a wrap film, supposing that the wrap web is the wrap film, is prevented from unwinding into the carton 11 when the wrap film is cut if the cutter 17 is attached to a bottom surface 18 of the carton body 12 by a pressure sensitive adhesive which is applied along one of the entire surfaces of the cutter 17. More in detail, there is employed a sheet which is formed by applying, e.g. a cross-linking modacrylic pressure sensitive adhesive to the vulcanized fiber or parchment paper in the thickness of 32 g/m$^2$, pasting a separate paper on the pressure sensitive adhesive, punching the sheet in the same shape as illustrated in FIG. 2, separating the separate paper so as to expose the pressure sensitive adhesive and attaching the cutter 17 on the bottom surface 18 so that the edges 17a of the cutter protrude from the front wall 16 of the carton body 12. In such a manner, since the pressure sensitive adhesive remains exposed on the reverse surface of the protruded edges 17a of the cutter 17, if the wrap film is drawn out from the upper opening 13 of the carton body 12 and further drawn out while it is pressed by the cover flap 15 and then cut, the tip end of the remaining wrap film remains stuck to the pressure sensitive adhesive, whereby the remaining wrap film is prevented from unwinding into the carton body 12.

Figure 4:
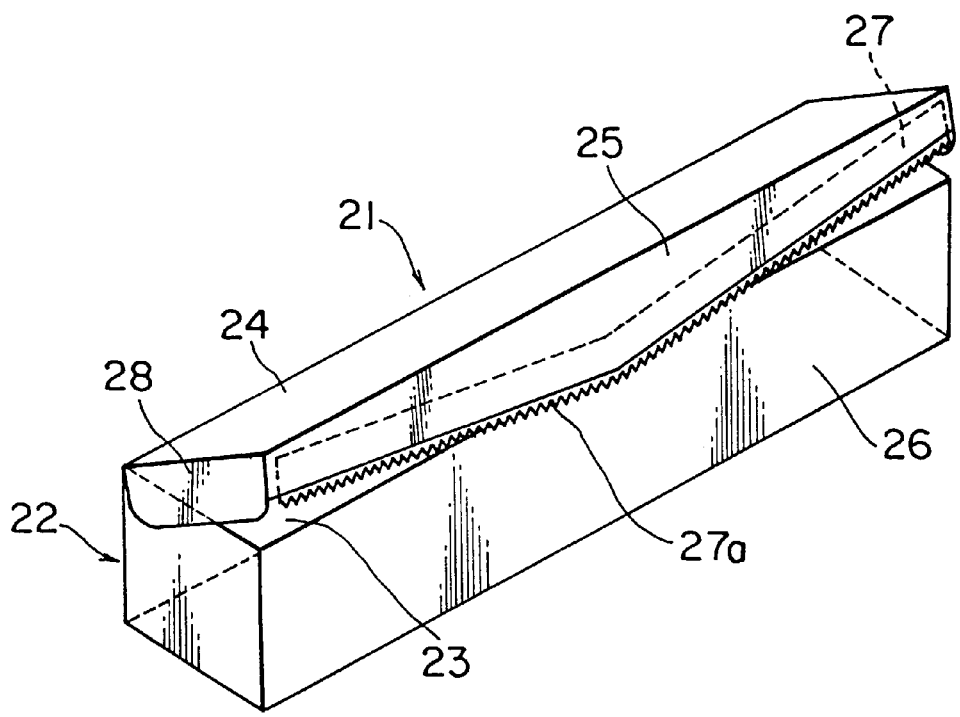
FIG. 4 is a perspective view of a wrap web containing carton according to a second modified example of the first embodiment of the present invention.

Second and third modified examples of the first embodiment of the present invention will be described with reference to FIGS. 4 and 5 which are perspective views of a carton 21.

The carton 21 has a cover body 24 and a cover flap 25 which is gently inclined at the tip end thereof for forming a V-shape and a cutter 27 which is attached to the tip end of an inner surface of the cover flap 25. Both the cover body 24 and the cover flap 25 are fixed to side plates 28 and can cover an upper opening 23 when the carton 21 is not used. The cutter 27 is formed by punching the vulcanized fiber or the parchment paper having the thickness of 0.3 mm and the Rockwell hardness of 90 to 120.

The wrap web can be cut as follows. The end of the warp web is gripped and drawn out by one hand from the upper opening 23 of the carton body 22 while the wrap web is held by the other hand between the cover flap 25 and a front side wall 26, and successively the end of the wrap web is drawn out frontward by one hand in FIG. 4 and the wrap web is cut by the edges 27a of the cutter 27.

Figure 5:
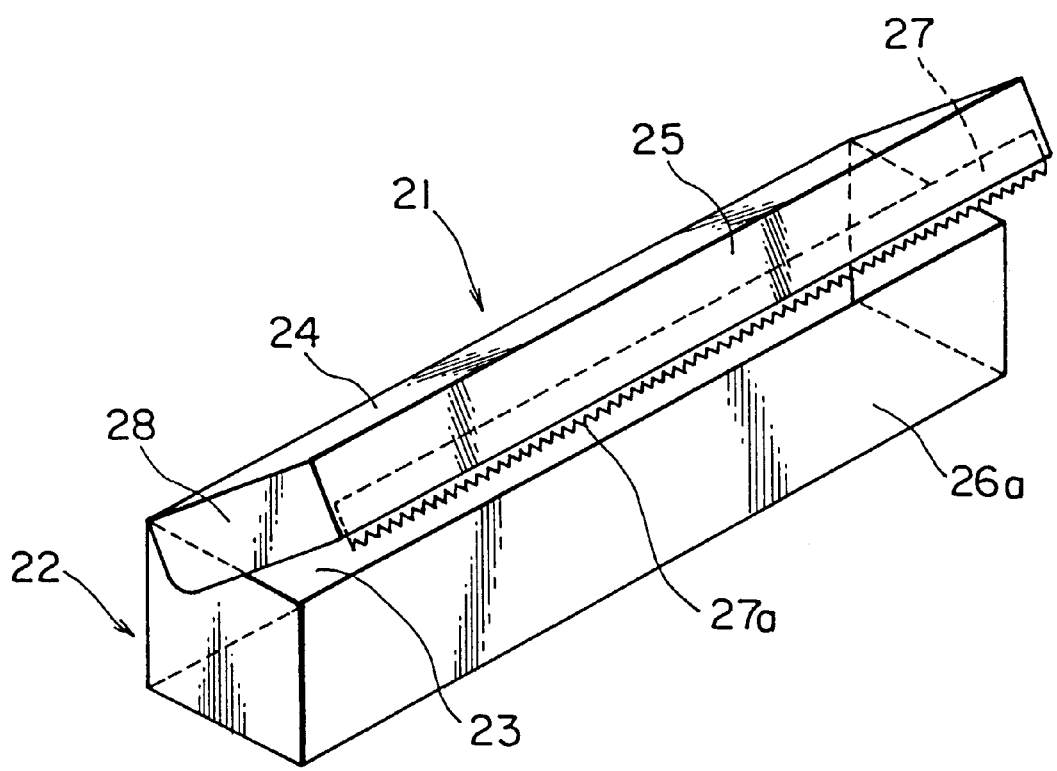
FIG. 5 is a perspective view of a wrap web containing carton according to a third modified example of the first embodiment of the present invention.

The carton 21 as illustrated in FIG. 5 has the cover flap 25 which is not V-shaped but straight at the tip end thereof.

It is possible to use a tracing paper as the sheet of the cutter. The tracing paper is preferable to be the natural tracing paper which is formed by cutting a pulp fiber, formed of substantially 100% of a soft wood pulp, to fine pieces or crushing it strong. A pencil hardness of the tracing paper may be greater than 5H, and is preferable to be 6H in view of the sharpness and the durability of the cutter 17. The thickness of the tracing paper is preferable to range from 200 to 500 μm. That is, if the thickness is less than 200 μm, the strength of the tracing paper is insufficient while if the thickness is greater than 500 μm, a punching process property of the punched tracing paper is deteriorated and the cost thereof is increased. Accordingly, the thickness of the tracing paper is preferable practically to range from 200 to 350 μm. When the cutter 17 is attached to the carton 21, the same means as employed in the first example can be used.

When the tracing paper having the thickness of less than 200 μm is employed, it is preferable to use a converted paper which is formed by pasting one tracing paper onto another tracing paper or a converted paper which is formed by pasting the tracing paper onto a hard paper in order to give a sufficient strength to the tracing paper.

In the former converted paper, there are those which are formed by the steps of laminating and pasting two tracing papers having the thickness respectively of 100 to 200 μm by an epoxy resin adhesive having the thickness of 20 to 100 μm or formed by the steps of performing extrusion coating of a polyethylene having the thickness of 15 to 50 μm to thereby stick two tracing papers the one which is formed by pasting the tracing paper having the thickness of 100 to 200 μm to the resin impregnated paper by an epoxy resin adhesive or polyethylene. A polyester impregnated paper is preferable as a resign pregnating paper. That is, the resin impregnated paper is formed by the steps of impregnating an unsaturated polyester resin into an unbleached pulp and heating the same resultant impregnated resin. Since such resin impregnated paper is soft, such resin impregnated paper can be subjected to a thermosetting process while it is wound. The thickness of the resin impregnated paper is preferable to range from 150 to 300 μm in view of the punching process property after the two tracing paper are pasted. If need be, an acrylic resin, a melanin resin, anrylic-melanic resin compound resin can be replaced by the polyester resin. However, the epoxy resin is preferably used when the two tracing paper are pasted.

Furthermore, as the latter converted paper, there is the one which is formed by pasting the tracing paper having the thickness of 100 to 200 μm onto a recycle paper by the epoxy resin or the polyethylene. The recycle paper is preferable to have the thickness of 100 to 300 μm. Such a recycle paper is preferable in view of the conservation of forests.

In the cutter formed by punching the latter converted paper, since one surface thereof is formed of the tracing paper, it is necessary to attach the cutter to the carton body at the wrap web cutting position at the state where the cutter is brought into contact with the wrap web at the tracing paper side.

Since the cutter of the present invention has a good sharpness owing to the hardness of the hard paper, the cutter can be replaced by the conventional metallic cutter. Furthermore, since the cutter of the present invention is not so sharp compared with the conventional cutter, there is no likelihood of injuring the fingers, etc. when the wrap web is drawn out. Furthermore, since the cutter can be attached to the carton by the adhesive, etc. the cutter can be easily attached to the carton or the box containing the pressure sensitive adhesive tape, etc. Furthermore, since the cutter is formed of a wood fiber and easily incinerated, there is no likelihood of causing the environmental problem even if the cutter is wasted while it remains attached to the carton or the box.

Since the carton according to the present invention is provided with the cutter formed of a wood fiber, the carton can be easily incinerated even if the cutter is not separated from the carton. Accordingly, it is adapted for solving the environmental problem and excellent in the incineration property.

Second Embodiment (FIGS. 6 to 14)

A second embodiment of the present invention will be described with reference to FIGS. 6 to 14 which show an example of an apparatus for manufacturing a cutter and attaching the same to a carton.

A sheet S is formed of plastics or a paperboard. A pressure sensitive adhesive is applied onto a rear surface of the sheet S and a separate paper S1 is attached to the pressure sensitive adhesive.

A manufacturing and attaching apparatus 110 comprises a vertically movable upper mold 120 and a fixed lower mold 130. An upper blade 121 having saw teeth-shape edges 121a at the light end thereof is attached to the lower portion of the upper mold 120 which a lower blade 131 having a sawtooth-shape edges 131a at the left end thereof is attached to the upper portion of the lower mold 130. These edges 121a and 131a engage with each other so as to cut the object in the sawtooth-shape. The upper blade 121 of the upper mold 120 has therein a suction means 122 comprising a plurality of vacuum holes.

Figure 6:
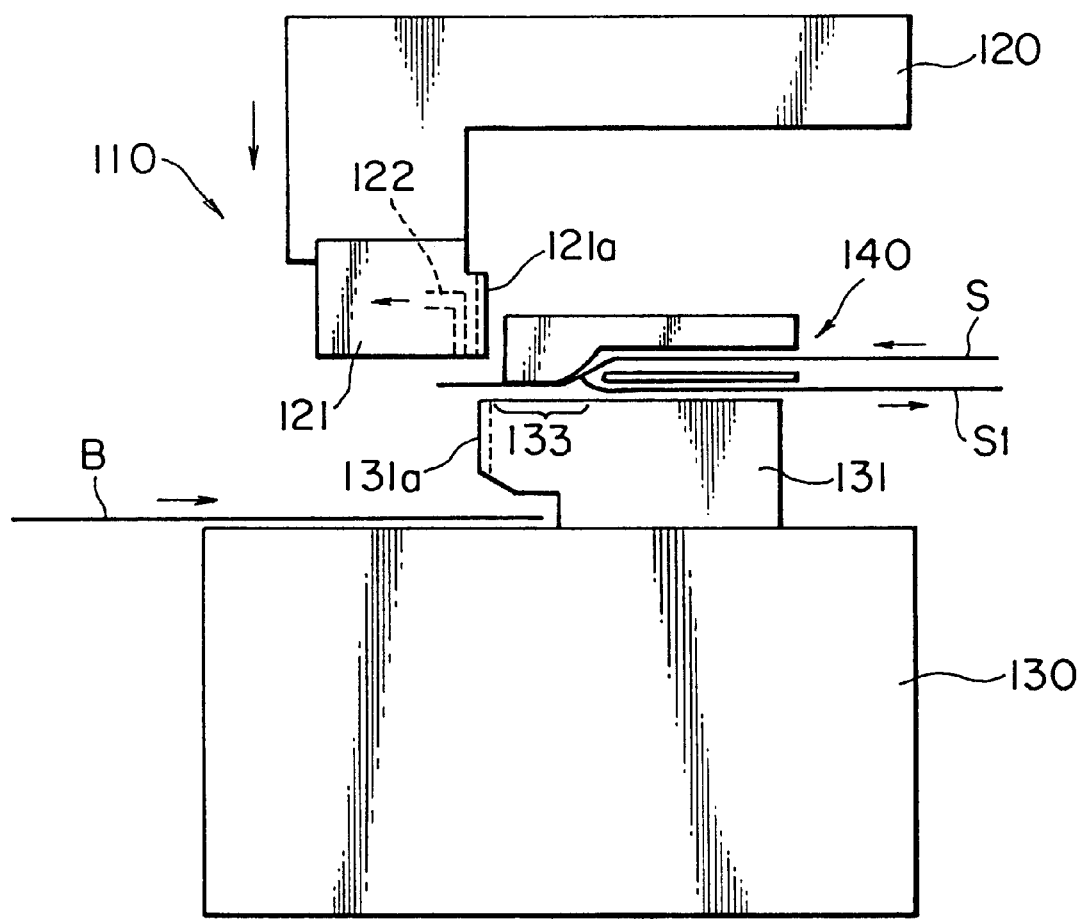
FIG. 6 is a schematic side view showing a main portion of a cutter manufacturing and attaching apparatus according to a second embodiment of the present invention which is viewed at the position of a top dead center of an upper mold.

When the upper mold 120 is positioned at the top dead center as illustrated in FIG. 6, the sheet S is intermittently fed by a feeding means, not shown, so that the sheet S protrudes from the lower blade 131 in a given length. In this case, the separate paper S1 is peeled from the pressure sensitive adhesive through a peeling means 140. The tip portion of the thus fed sheet S is cut by the upper blade 121 and the lower blade 131 when the upper mold 120 lowers so that a band-shaped cutter is formed. The thus formed cutter lowers while it is held by the suction means 122 under the upper blade 121 and is pressed to contact the upper surface of the carton B, which is conveyed to the portion under the bottom dead center of the upper blade 121, by a conveying means, as described later and illustrated in FIG. 8, at the given position thereof and it is attached to the pressure sensitive adhesive surface thereof as illustrated in FIG. 7. Thereafter, when the suction means 122 stops its operation and the upper mold 120 rises, the carton B integrated with the cutter is fed by the conveying means. Successively, the next carton B is conveyed to the same position. When the upper mold 120 rises to the position close to the top dead center, the sheet S is fed in a given length, and thereafter the attachment of the cutter to the carton B is carried out successively. A region 133 of the upper surface of the lower blade 131 is subjected to a mold release process by TEFLON, i.e. polytetrafluorethylen to prevent the pressure sensitive adhesive from pasting to the region 133.

Figure 8:
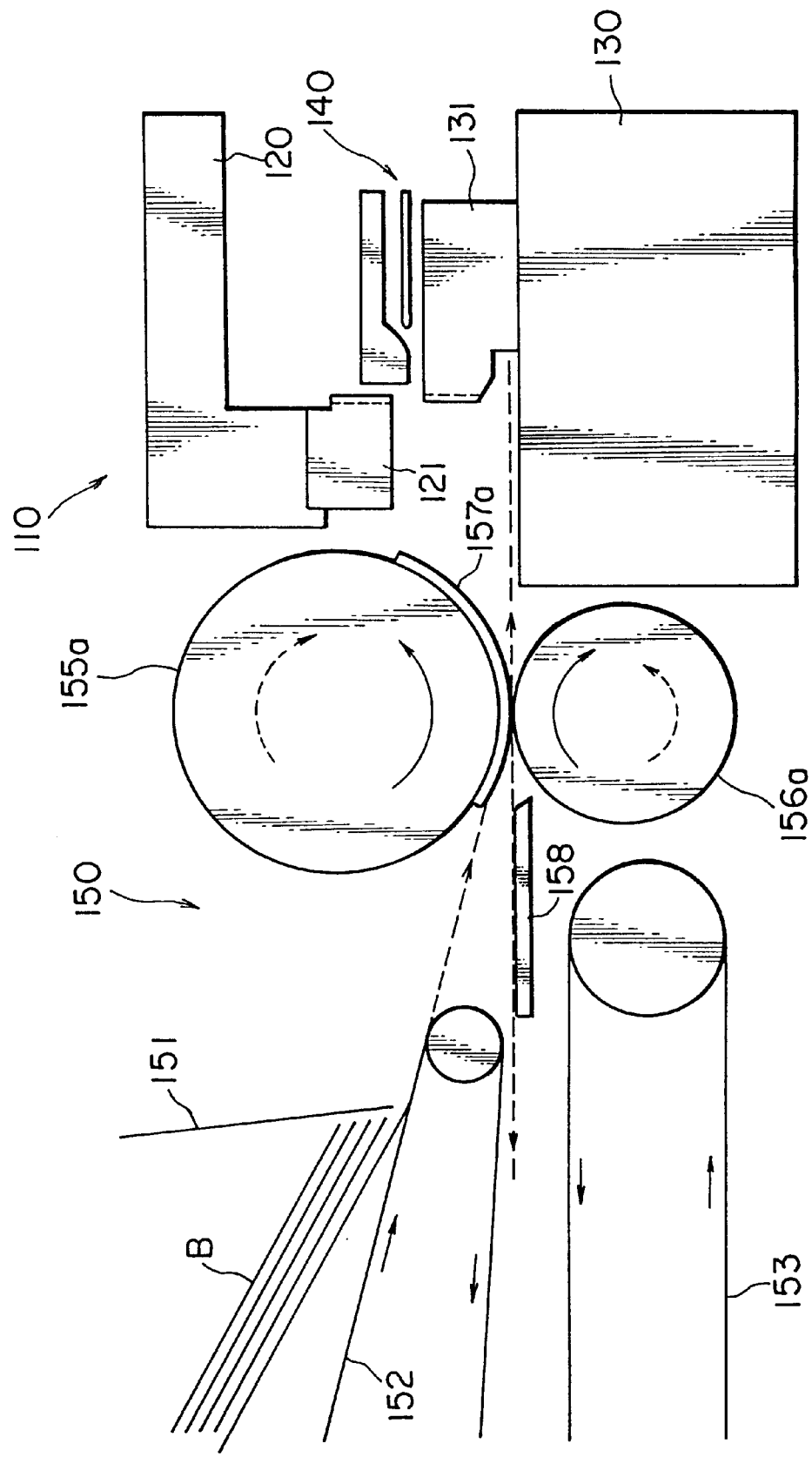
FIG. 8 is a schematic side view showing an example of a conveying device which is employed in the cutter manufacturing and attaching apparatus of FIG. 6.
Figure 9:
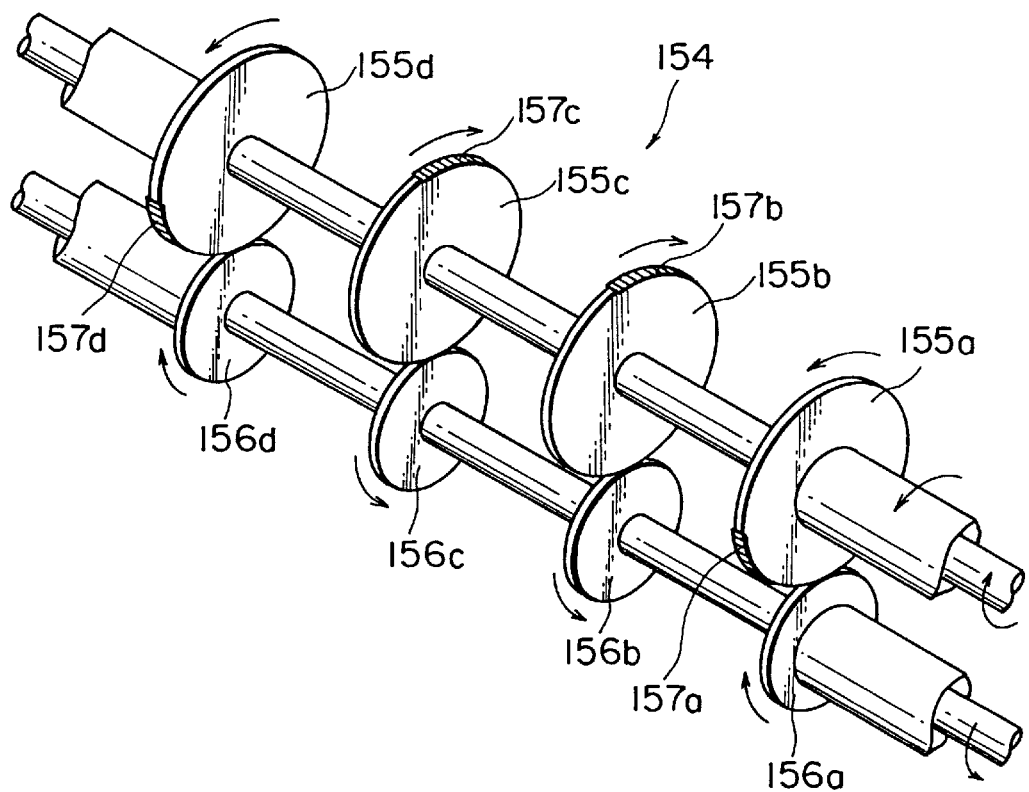
FIG. 9 is a perspective view of a nip roller of the conveying device which is employed in the cutter manufacturing and attaching apparatus of FIG. 6.

An example of the conveying means 150 for conveying the carton B is illustrated in FIG. 8. The conveying means 150 comprises a feeder 151, a feeding conveyor 152, a discharge conveyor 153 and a nip roller portion 154 which is illustrated perspectively in FIG. 9. The nip roller portion 154 comprises upper side nip rollers 155a to 155d and lower side nip rollers 156a to 156d which are respectively arranged coaxially in four columns and have double investing mechanism. That is, the columns of the upper side nip rollers 155a to 155d engage with the other columns of the lower side nip rollers 156a to 156d. The outside two columns of nip rollers 155a, 155d and 156a, 156d serve for feeding the sheet S forward, i.e. toward the lower mold 130 whereas the inner two columns of nip rollers 155b, 155c and 156b, 156c serve for feeding the sheet S backward, i.e. toward the discharge conveyor 153. The timing for nipping the carton B is determined by the time when any of rubbers 157a to 157d on the upper side nip rollers 156a to 156d nip the carton B.

The carton B which is set in the feeder 151 of the conveying means 150 is fed one by one between the upper side nip rollers 155a to 155d and the lower side nip roller 156a to 156d by a feeding conveyor 152. The carton B is set in a given position of the lower mold 130 when the upper nip rollers 155a to 155d rotate counterclockwise while one end of the carton B is clamped by the nip roller portion 154. When the cutter is attached to the carton B at this given position, the carton B having the cutter thereon is fed toward a discharge conveyor 153 by way of a receiving table 158 when the upper side nip rollers 155b and 155c rotate clockwise.

Figure 10:
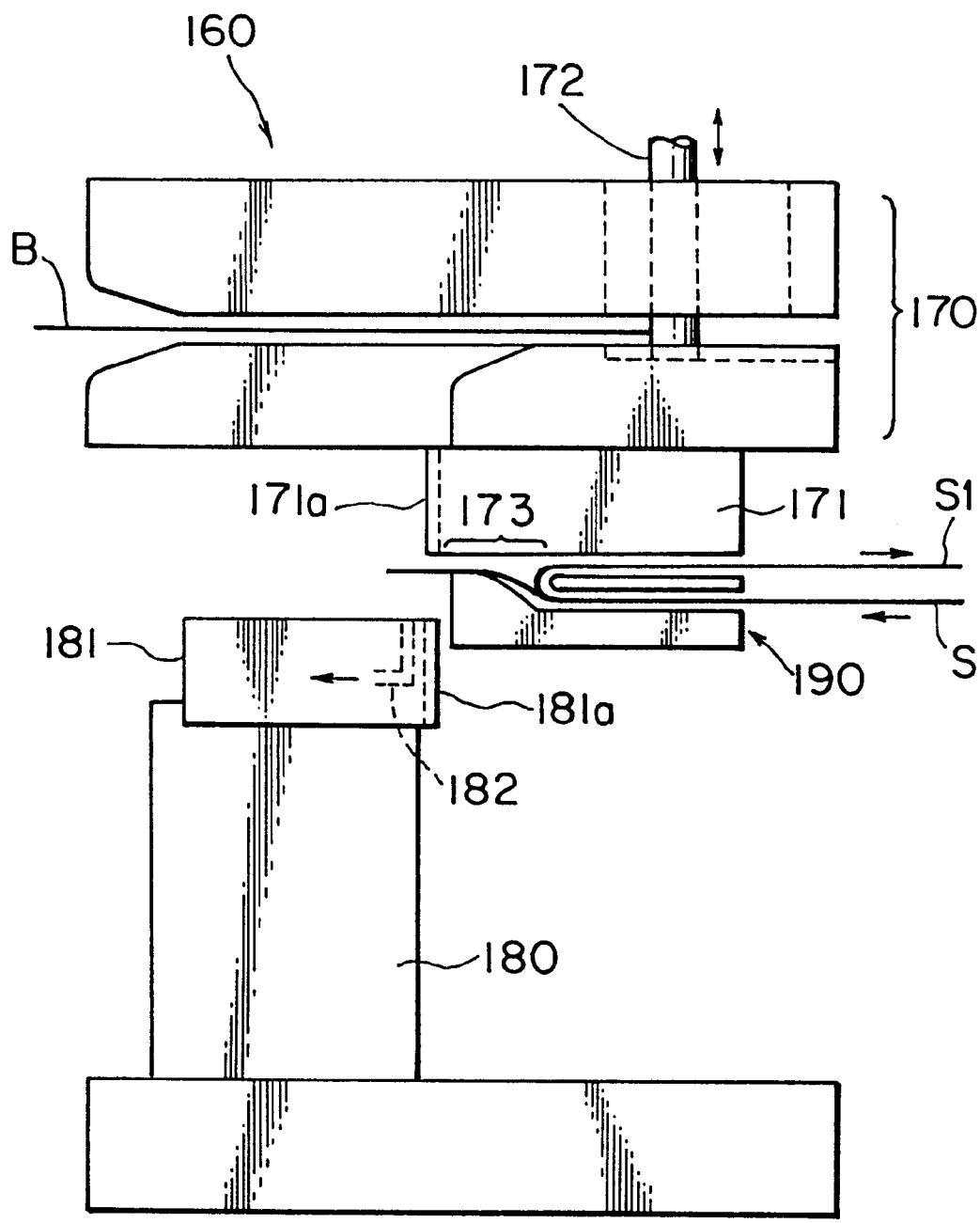
FIG. 10 is a schematic side view showing a main portion of a cutter manufacturing and attaching apparatus according to a modified example of the second embodiment of the present invention which is viewed at the position of a bottom dead center of a lower mold.
Figure 11:
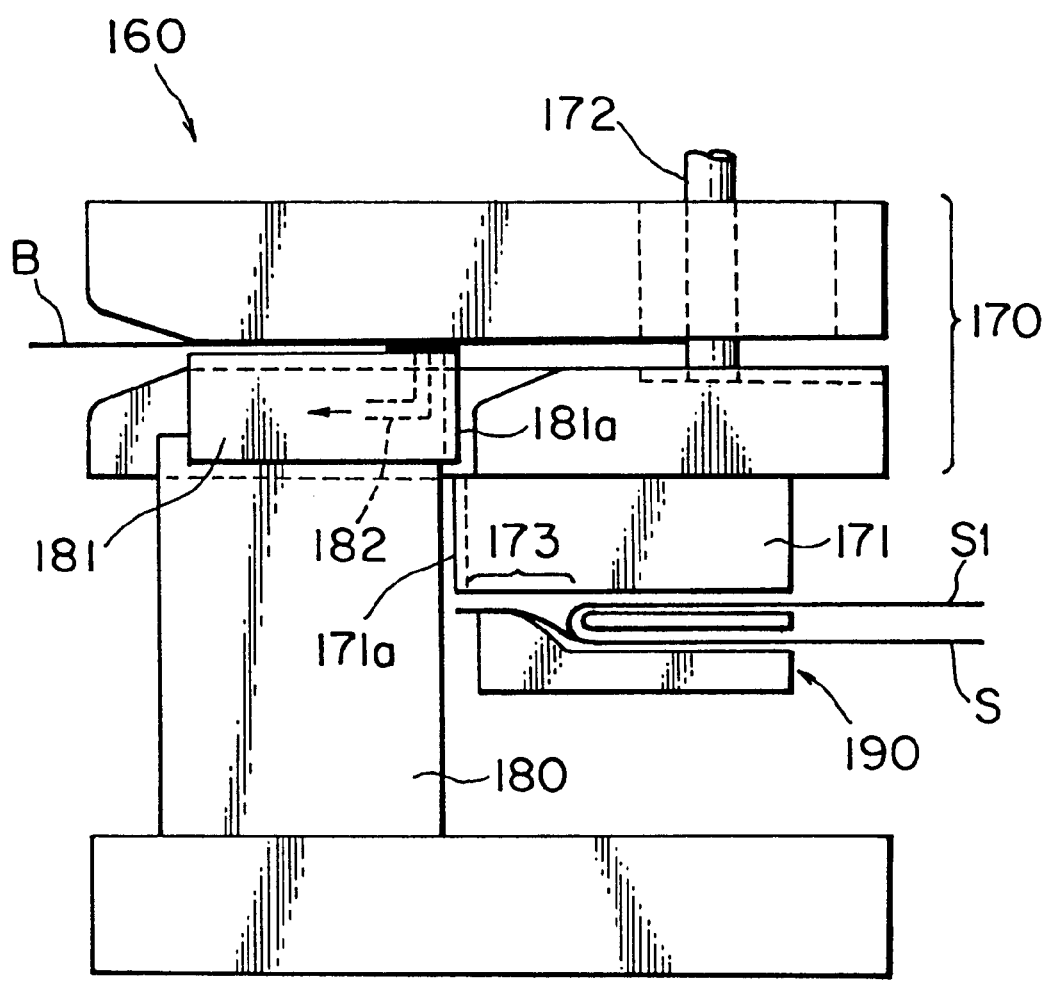
FIG. 11 is a schematic side view showing the main portion of a cutter manufacturing and attaching apparatus according to the modified example of the second embodiment of the present invention which is viewed at the position of a top dead center of the lower mold.
Figure 12:
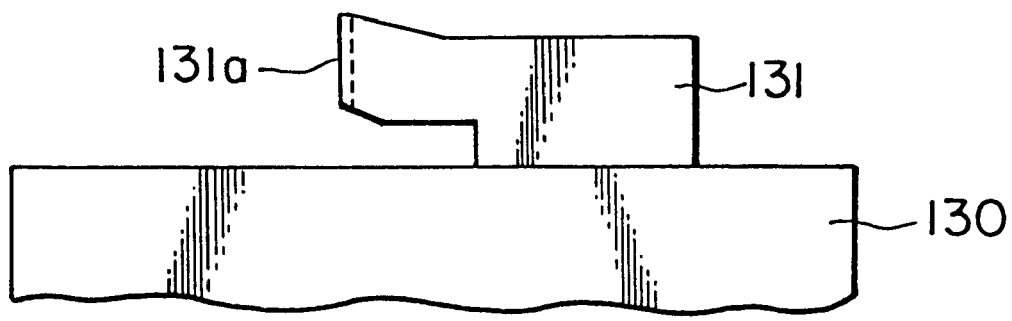
FIG. 12 is a side view showing a main portion of a modified lower mold according to the second embodiment of FIG. 6.
Figure 13:
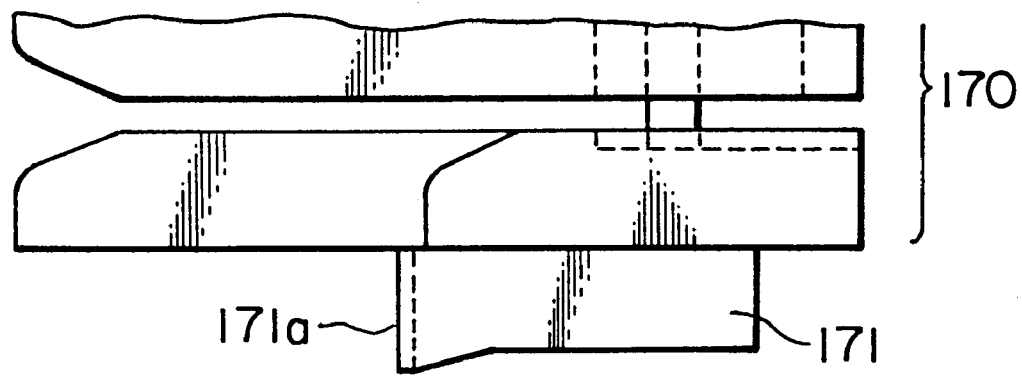
FIG. 13 is a side view showing a main portion of a modified upper mold according to the modified example of the second embodiment of FIG. 10.

A cutter manufacturing and attaching apparatus according to a modified example of the second embodiment will be described with reference to FIGS. 10 to 13 wherein FIG. 10 shows the state where a lower mold 180 of the apparatus is positioned at the bottom dead center and FIG. 11 shows the state the lower mold 180 of the apparatus is positioned at the top dead center.

An object of the modified example is the same as that of the embodiment of FIG. 6, i.e. a sheet S to which a pressure sensitive adhesive is applied and a separate paper S is pasted on the same adhesive. A manufacturing and attaching apparatus 160 comprises a fixed upper mold 170 and a vertically movable lower mold 180. An upper blade 171 having sawtooth-shape edges 171a at the left end thereof is attached to the lower portion of the upper mold 170 while a lower blade 181 having sawtooth-shape edges 181a at the night end thereof is attached to the upper portion of the lower mold 180. These edges 171a and 181a engage with each other so as to cut the object in the saw-tooth shape. The lower blade 181 of the lower mold 180 has therein a suction means 182 comprising a plurality of vacuum holes.

When the lower mold 180 is positioned at the position adjacent to the bottom dead center as illustrated in FIG. 10, the sheet S is intermittently fed toward the edges 171a and 181a by a feeding means, not shown, so as to protrude in a given length. In this case, a separate paper S1 is also to be peeled from the pressure sensitive adhesive through a peeling means 190. The tip portion of the thus fed sheet S is cut by the upper blade 171 and the lower blade 181 when the lower mold 180 rises so that a band-shaped cutter is formed. The thus formed cutter rises while it is held by the suction means 182 on the lower blade 181 and is pressed toward a lower surface of the carton B, which is conveyed from the left in the drawing to the portion over the top dead center of the lower blade 181, by a conveying means, not shown, at a given position thereof and is attached to the carton B by the pressure sensitive adhesive surface as illustrated in FIG. 11. When the lower mold 180 lowers and the stopper 172 rises after the suction means 182 stops its operation, the carton B integrated with the cutter is fed by the conveying means toward the right in the drawing. Successively, the next carton B is conveyed to the same position. When the lower mold 180 lowers to the bottom dead center, the sheet S is fed in a given length, and thereafter attachment of the cutter to the carton B is successively carried out. A region 173 of the lower surface of the upper blade 171 is subjected to a mold release process by Teflon, i.e. polytetrafluorethylen to prevent the pressure sensitive adhesive from pasting to the region 173.

According to the second embodiment, although the region 133 of the upper surface of the lower blade 131 and the region 173 of the lower surface of the upper blade 171 are subjected to the mold release process so that the sheet S, to which the pressure sensitive adhesive is applied, is fed smoothly, the mold release process can be eliminated. That is, the tip end of the edge 131a of the lower blade 131 is inclined aslant toward the upper surface of the lower blade 131 or the edge 171a of the upper blade 171 is inclined aslant toward the lower surface of the upper blade 171 so as to be respectively tapered toward the upper and lower surface of the lower and upper blades 131 and 171 whereby the adhesive surface of the sheet S to not contact the upper surface of the lower blade 131 or the lower surface of the upper blade 171.

Although the adhesive paste is applied to the sheet S, the adhesive paste may be applied to the carton before it enters the cutter manufacturing and attaching apparatus.

Figure 14:
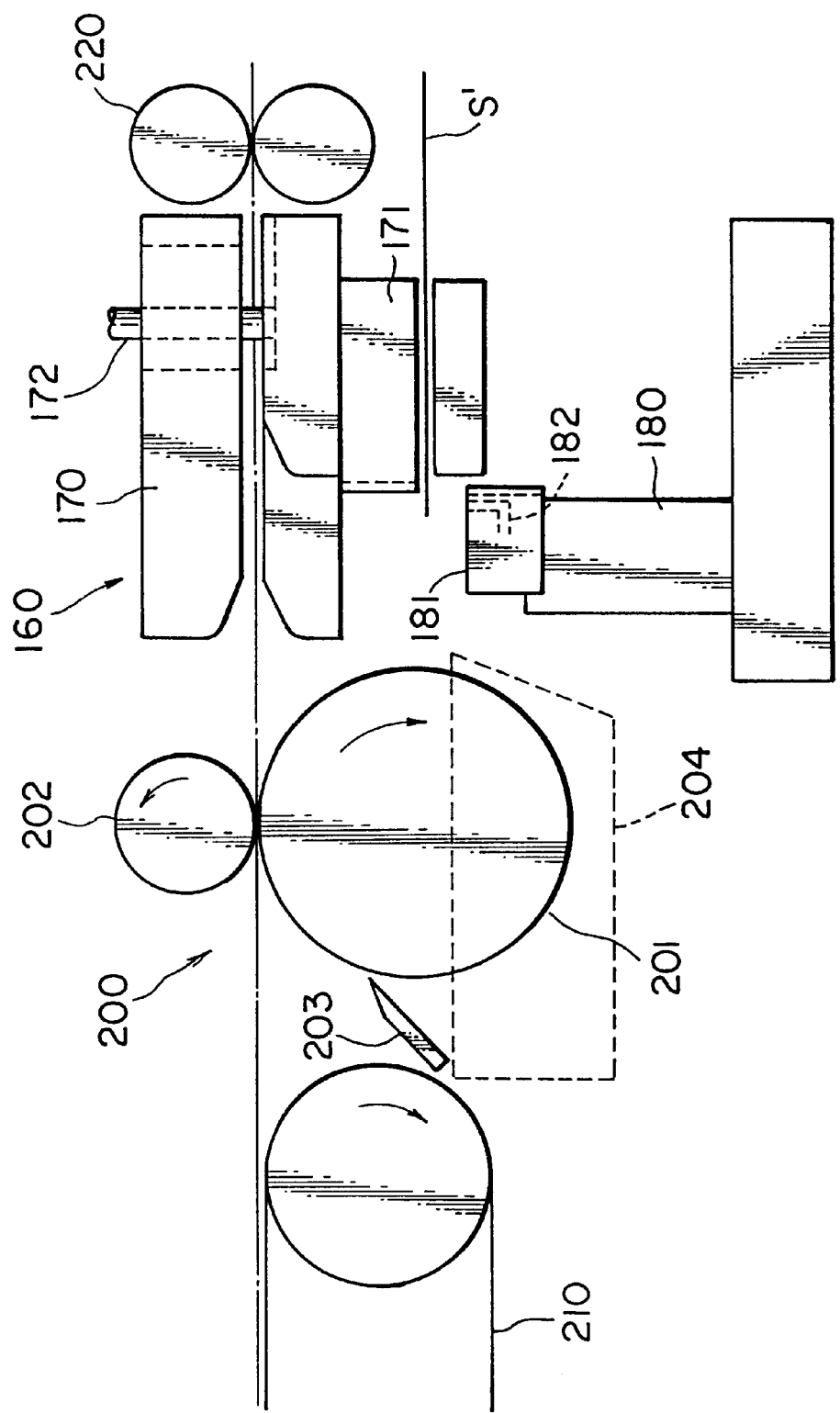
FIG. 14 is a side view of a cutter manufacturing and attaching apparatus provided with a cutter attaching device and a pasting device according to another modified example of the second embodiment.

A cutter attaching device 160 according to another example of the second embodiment will be described with reference to FIG. 14.

A pasting device 200 is disposed in front (at the left side in FIG. 14) of the cutter attaching device 160. The pasting device 200 is of a gravure coater type and comprises a form cylinder 201, an impression cylinder 202, a doctor 203 and an ink pan 204 for containing an adhesive. A chain 210 having pins is disposed at the front portion of the pasting device 200 for feeding the carton one by one and a nip roller 220 is disposed at the rear portion of the cutter attaching device 160 for clamping and taking out the carton. The form cylinder 201 and the impression cylinder 202 of the pasting device 200 serve as a feeding roller for feeding the carton into the cutter attaching device 160. Accordingly, when the carton is brought into contact with a stopper 172, the impression cylinder 202 is moved way from the form cylinder 201 and returns to the original position when the cutter is attached to the carton and the stopper 172 rises whereby the carton is fed toward the nip roller 220. The circumferential length of the form cylinder 201 has the same pitch as the feeding latchet so as to be the same speed as the chain 210.

The carton is fed into the pasting device 200 one by one by the chain 210 and pressure sensitive adhesive is applied to the carton at the given position thereof in the pasting device 200. The carton is fed into the cutter attaching device 160 until it strikes against the stopper 172 through the gap in the upper mold 170. Whereupon, the sheet S', which is intermittently fed toward the cutter attaching device 160 by a feeding means, not shown, is cut by the upper blade 171 and the lower blade 181 to form the band-shaped cutter when the lower mold 180 rises. The cutter rises while it is held by the suction means 182 of the lower blade 181 on the upper portion of the lower blade 181 and is pressed against the carton at the given position. The carton having the cutter which is attached thereto in such a manner is conveyed toward the nip roller 220 while it is clamped between the form cylinder 201 and the impression cylinder 202 when the stopper 172 rises and it is discharged from the nip roller 220.

It is preferable to use an emulsion type adhesive (modacrylic, vinyl acetate, ethylenelactic vinyl acetate or copolymer thereof) as the adhesive. However, if the form cylinder 201 is formed of a pressure roller, a hot melt type adhesive can be used. The printing depth of the form cylinder 201 is determined by the necessary adhesive force. Genrally, the deeper the printing depth (exceeding 100 mµ) is, the stronger the adhesive force is.

It is not necessary to use the sheet S to which the pressure sensitive adhesive is applied by using the pasting device 200. Accordingly, it is not necessary to provide the feeding means 140 and 190 as employed in the second embodiment. It is possible to obtain a sufficient adhesive force even in the low or high temperature compared with the case where the sheet S to which the pressure sensitive adhesive is applied. It goes without saying that the system for applying the adhesive to the carton can be applied to the cutter manufacturing and attaching apparatus having the vertically movable upper mold.

There are employed various attaching systems other than those set forth above. For example, the pressure sensitive attaching system can be used. In this case, the pressure sensitive adhesive is coated onto the sheet S at the entire surface or at a given position thereof and at the same time a heating means together with the suction means 122 or 182 are provided on the vertically movable upper blade 121 or the lower blade 181. If this system is employed, it is not necessary to provide the peeling means 140 and 190 which are employed in the second embodiment.

It is possible to employ the system for attaching the cutter to the carton by jetting the adhesive to the sheet which is on the way of being fed or to the carton at the given position before the cutter is attached to the carton by appropriately providing a paste jetting mechanism.

It goes without saying that the shape of the cutter can be arbitrarily formed depending on the shapes of the edges of the upper and lower blades and also appropriately formed in response to the quality of the sheet and the kind of the wrap web to be cut.

As mentioned above in detail, according to the cutter manufacturing and attaching apparatus according to the second embodiment, the sheet is successively fed between the upper and lower molds and cut thereby and the cutter thus formed is sucked and held by the vertically movable upper or lower mold and thereafter the cutter is pressed toward the carton at the adhesive surface thereof at the given position so that the attachment of the cutter can be automatically made without resorting to man power. Accordingly, it is possible to enhance the efficiency of the manufacturing process of the carton.

Third Embodiment (FIG. 15 to 24)

Figure 15:
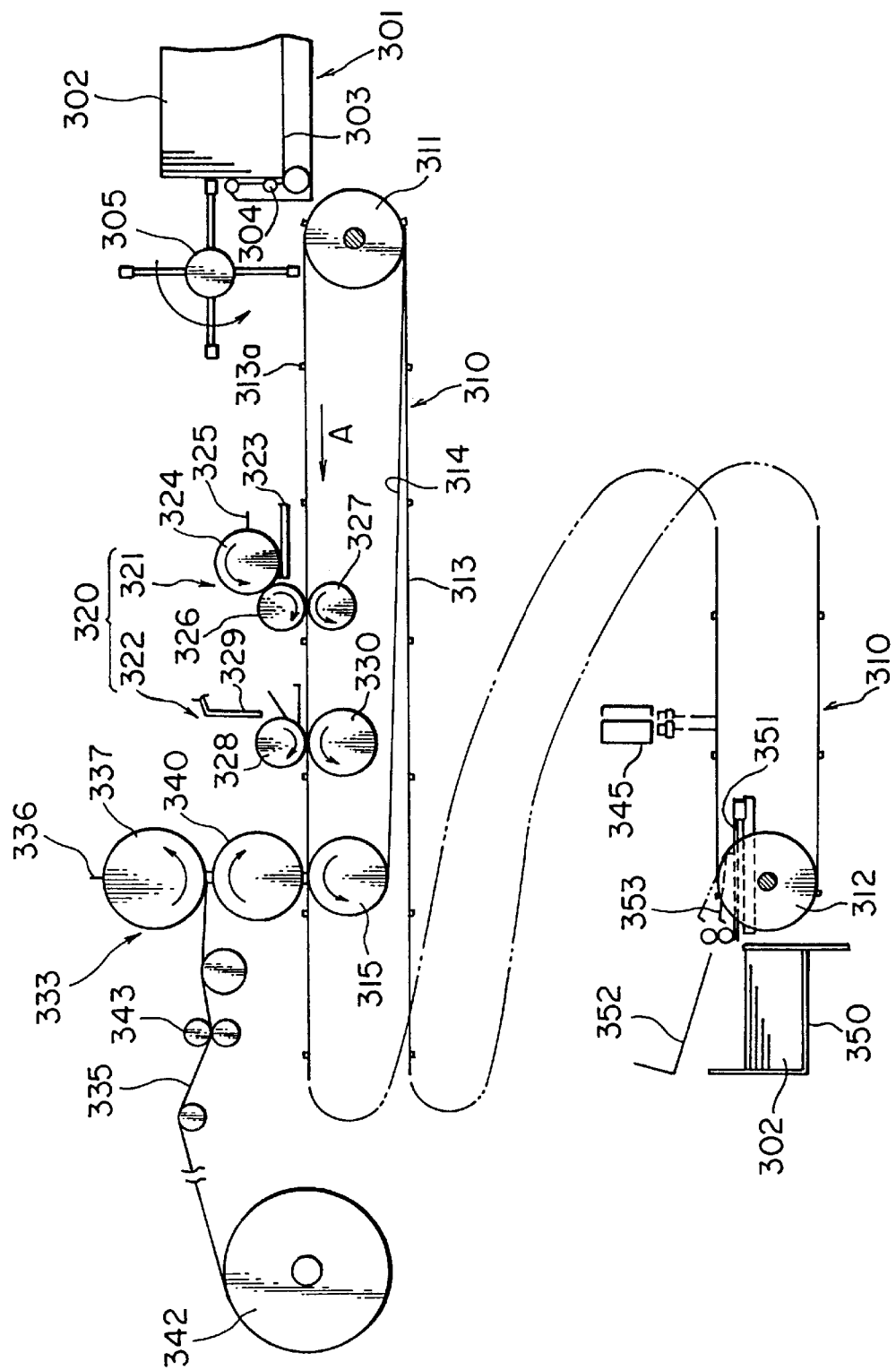
FIG. 15 is a schematic side view showing the arrangement of a cutter manufacturing and attaching apparatus according to a third embodiment of the present invention.
Figure 16:
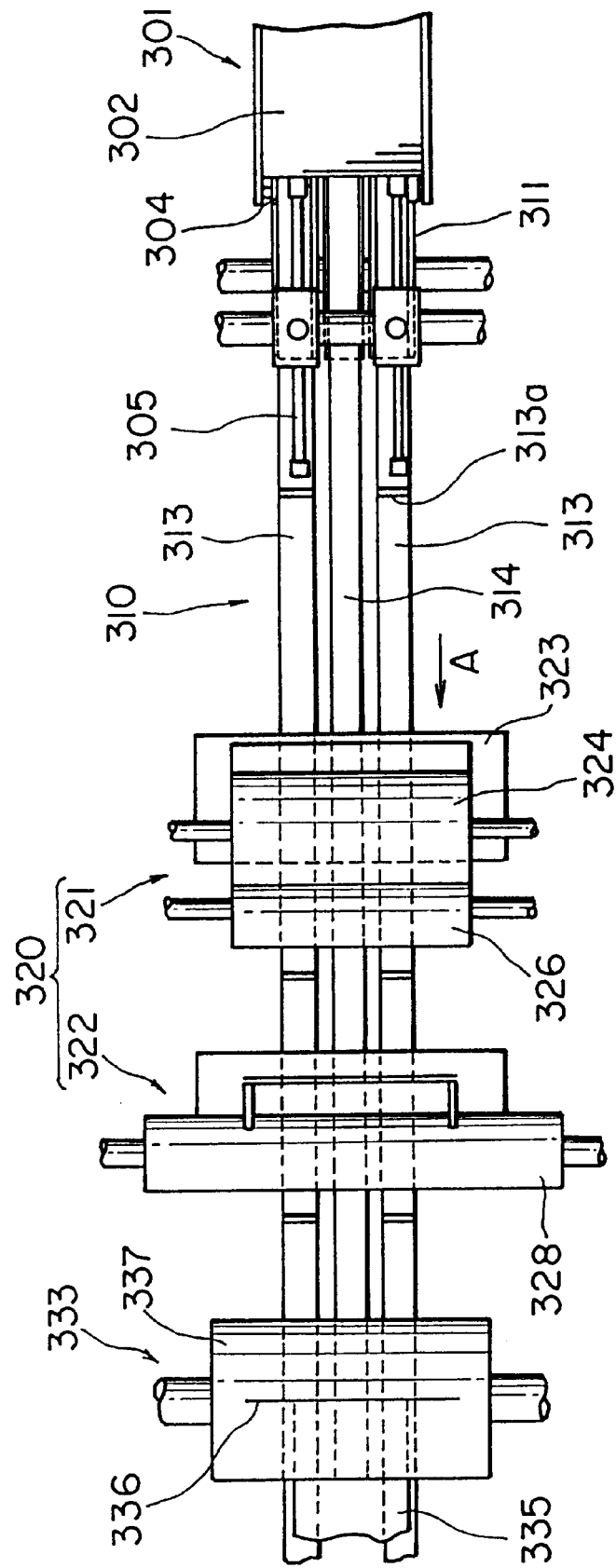
FIG. 16 is a schematic plan view showing a part of FIG. 15.

A cutter manufacturing and attaching apparatus according to a seventh embodiment will be described with reference to FIGS. 15 to 24 wherein FIG. 15 is a schematic side view and FIG. 16 is a schematic plan view of a part of FIG. 15.

Figure 22:
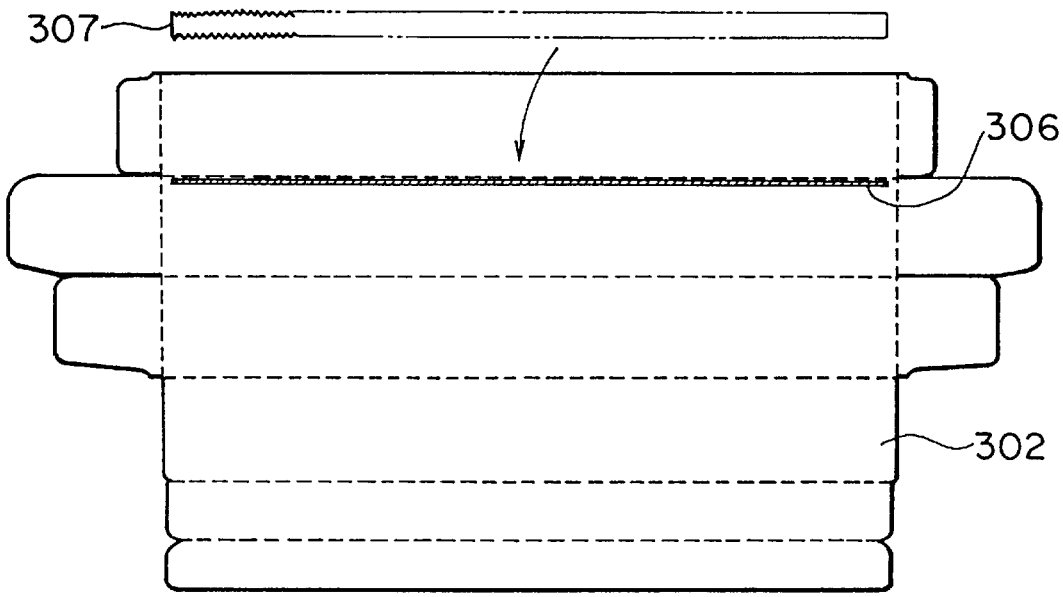
FIG. 22 is a plan view of an example of a carton and a cutter.
Figure 23:
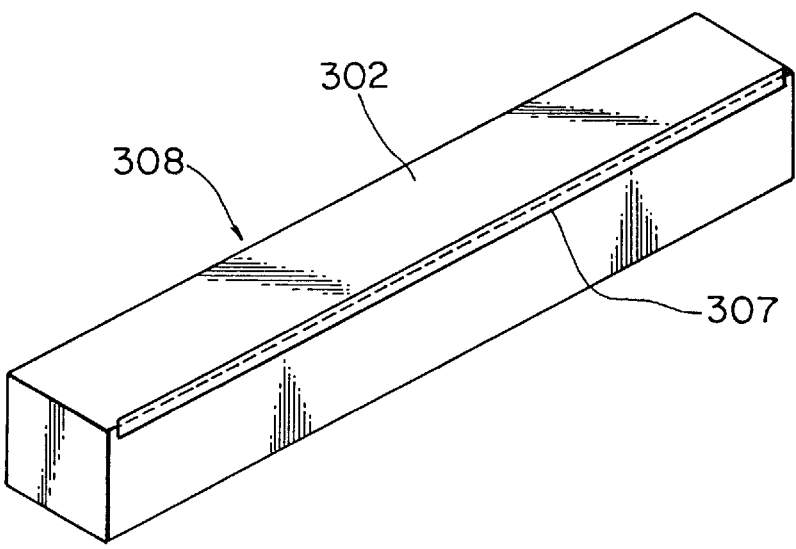
FIG. 23 is a perspective view showing the state where the carton is assembled.

A carton feeder 301 feeds a flat-shaped carton 302 to a conveying device 310, described later, before the latter is assembled and comprises a conveyor 303 for placing thereon a plurality of cartons 302 as they remain stand vertically, a stopper 304 for restricting the forward movement of the carton 302 and a feeder suction device 305 for sucking and drawing out the cartons 302 one by one. The shape of the carton 302 is not limited to specific one but is exemplified as the one as illustrated in FIG. 22. The carton 302 as illustrated in FIG. 22 is formed by applying the adhesive paste to a pasting portion 306 as illustrated by hatching in FIG. 22, pasting a cutter 307 on the pasting portion 306, and assembling the carton in a box shape whereby the box-shaped carton 308 can contain therein an aluminum foil or a resin film as illustrated in FIG. 23. The aluminum foil or the resin film contained in the carton can be drawn out and cut by the cutter 307.

The conveying device 310 conveys the carton 302, which is supplied from the carton feeder 301, successively in a horizontal direction. The conveying device 310 comprises pulleys 311 and 312 disposed at both ends thereof, a pair of belts 313 having pins thereon and entrained around the pulleys 311 and 312, a vacuum suction belt 314 which is disposed in the pair of belts 313 and a vacuum chamber, not shown, for applying negative pressure to a horizontal traveling portion of the vacuum suction belt 314. A plurality to small holes are defined on the vacuum suction belt 314 for sucking the carton 302 under vacuum condition. The vacuum suction belt 314 is entrained around a pulley which is coaxially disposed with the pulley 311, on which the belt 313 is entrained, and a supporting roller 315 which is disposed under a cutter manufacturing and pasting device 333, described later. Pins 313a are attached to the belt 313 at a given pitch for pushing the rear end of the carton 302 which is placed on the belt 313. The belt 313 and the vacuum suction belt 314 are forcibly driven by driving the pulley 311 or 312 and the supporting roller 315 wherein the traveling speed of the vacuum suction belt 314 is set to be slower than that of the belt 313.

Accordingly, as the carton, which is supplied from the carton feeder 301 to the belt 313 and the vacuum suction belt 314, is conveyed while it is sucked and held by the vacuum suction belt 314, the pin 313a of the belt 313 catch up with the rear end of the carton and thereafter it pushes the rear end of the carton to thereby convey the carton. Accordingly, the carton is always conveyed by the pin 313a of the belt 313 while it is positioned by the pin 313a.

A pasting device 320 is disposed over the traveling position of the carton 302 for applying the adhesive paste to the carton at the given position thereof which is conveyed by the conveying device 310. The pasting device 320 comprises an emulsion pasting device 321 and a hot melt pasting device 322 which can be properly used depending on the quality of the cutter or the carton to be used. As the case may be, either the emulsion pasting device 321 or the hot melt pasting device 322 can be omitted. The emulsion pasting device 321 comprises a paste 323, a supply roller 324, a doctor 325 and a relief form cylinder 326 wherein the emulsion paste which is stuck to a convex portion of the form cylinder 326 is applied to the carton which passes thereunder. A supporting roller 327 is disposed at a fixed position under the form cylinder 326 for supporting the belts 313 and 314 and the carton which passes thereover. Since the portion of the form cylinder 326 except the convex portion thereof is spaced approximately away from and over the belt 313, there is no obstacle for the pin 313a to pass under the form cylinder 326. The hot melt pasting device 322 comprises a gravure form cylinder 328 and a nozzle 329 supplying a hot melt paste to the form cylinder 328 wherein the hot melt past stored in the concave portion of the form cylinder 328 is applied to the carton 302 which passes thereunder. A supporting roller 330 is disposed under the hot melt pasting device 322 and is held by a lifting mechanism for lowering it so as to form a gap between itself and the form cylinder 328 through which the pin 313a can pass without any obstacle.

The cutter manufacturing and pasting device 333 is provided over the traveling position of the carton 302 which is conveyed by the conveying device 310 and downstream the pasting device 320. The cutter manufacturing and pasting device 333 severs the tip portion of a nonmetallic sheet 335 (refer to FIG. 19) such as a paper sheet, etc. to thereby form a cutter 307 and attaches the cutter 307 to the carton 302. The cutter manufacturing and pasting device 333 is of a rotary cutter type comprising a cutter roller 337 having a cutter blade 336 and a receiving roller 340 which is disposed in parallel with the cutter roller 337 and rotates in synchronism with the cutter roller 337.

Figure 17:
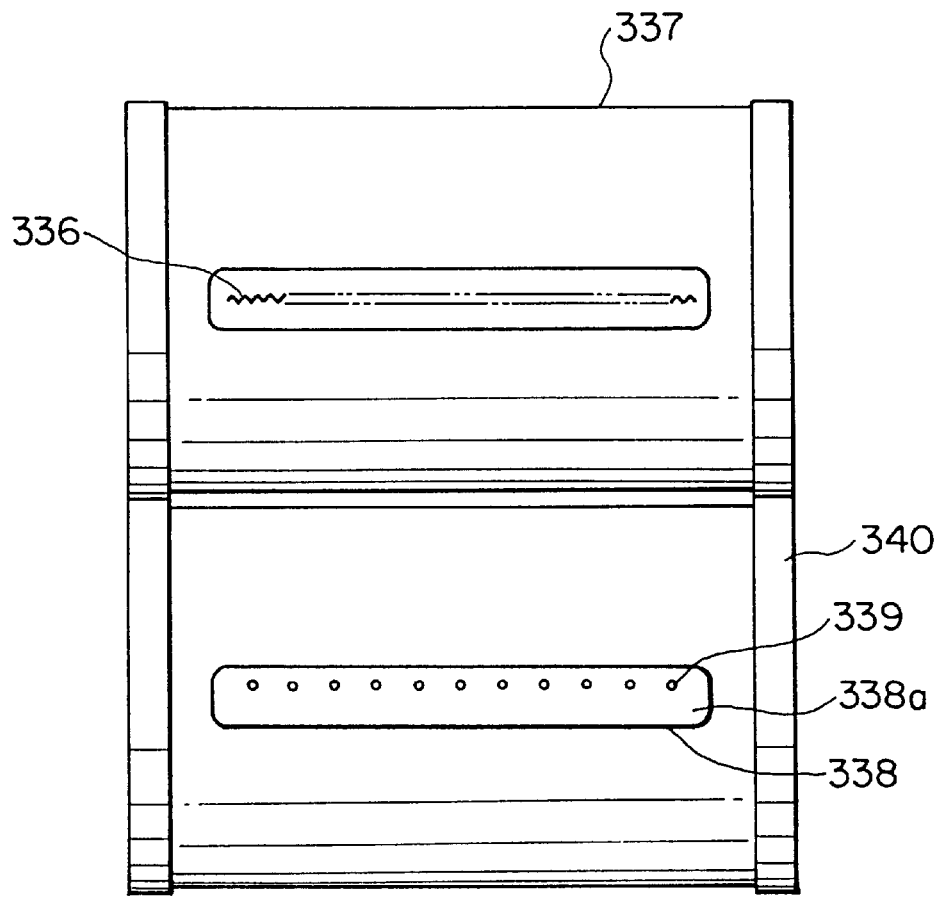
FIG. 17 is a side view of a cutter roller and a suction roller of the cutter manufacturing and attaching apparatus of FIG. 15.
Figure 18:
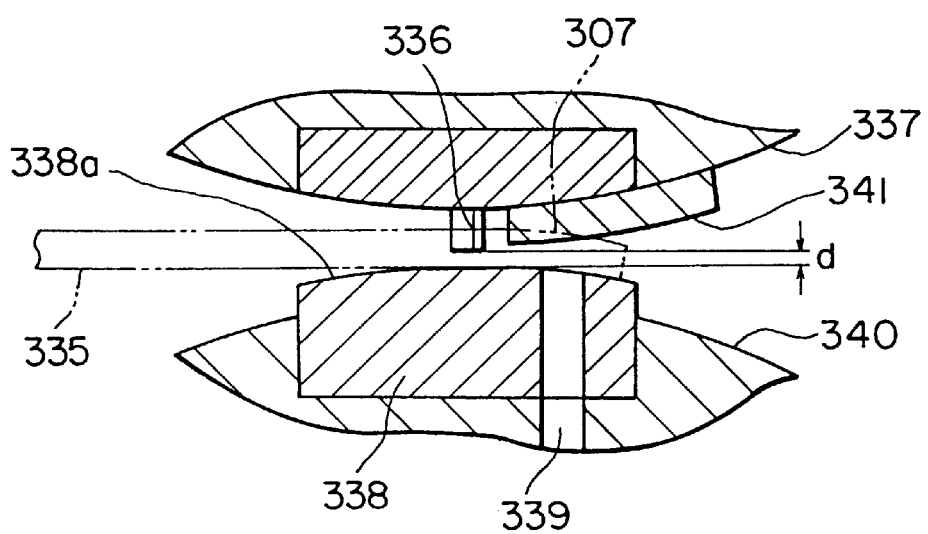
FIG. 18 is a cross-sectional view which enlarges the main portion of the cutter roller and the suction roller of FIG. 17.
Figure 19:
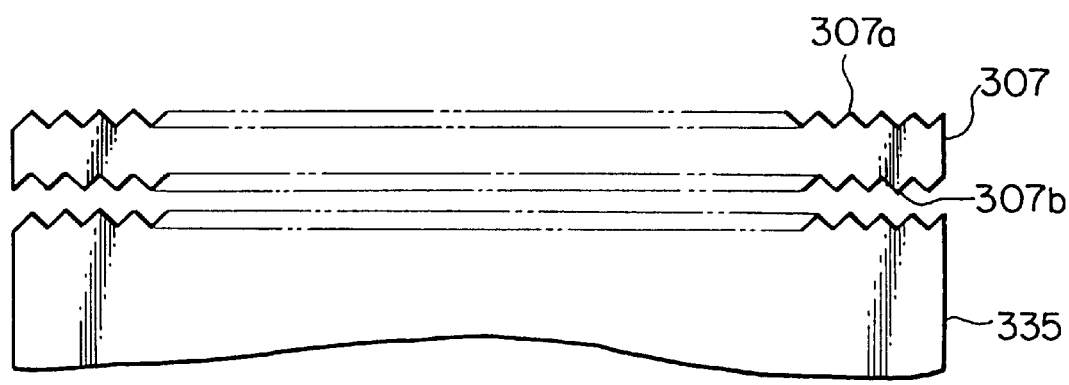
FIG. 19 is a plan view showing edges of a cutter which is formed by cutting a tip portion a sheet and the tip end of the sheet.
Figure 20:
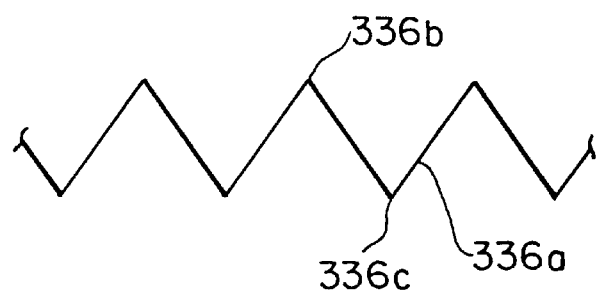
FIG. 20 is a front view which enlarges the edges of a cutter blade provided at a cutter roller when viewed toward the edges.
Figure 21:
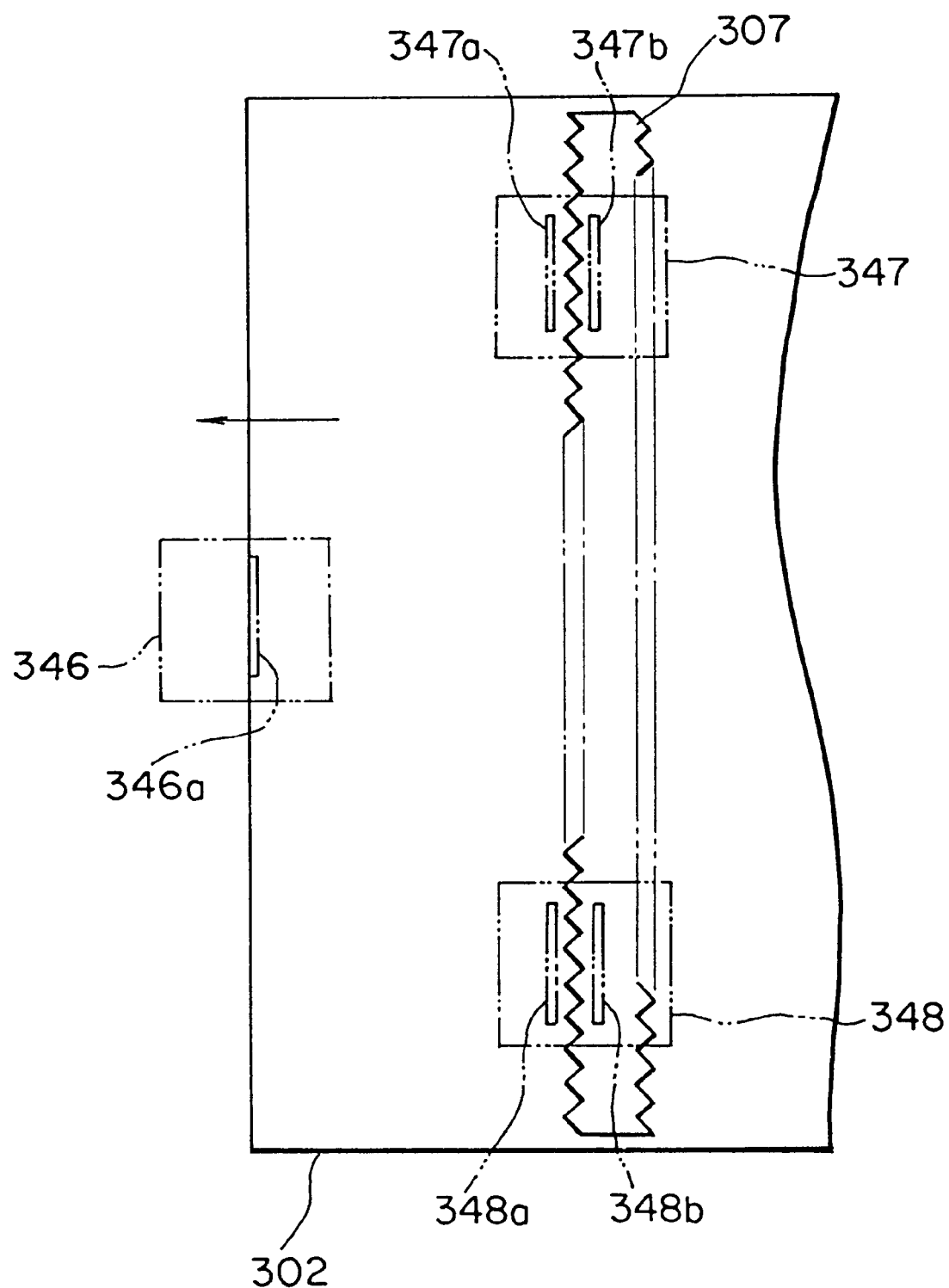
FIG. 21 is a plan view of a carton for explaining observation regions by an inspecting device.

As illustrated in FIGS. 17 and 18, the cutter blade 336 of the cutter roller 337 is provided so as to protrude radially outwardly the cutter roller 337 and extend in the axial direction of the cutter roller 337 wherein the cutter blade 336 of the cutter roller 337 is formed in zigzag so that the shape of the edges of the cutter blade 336, when viewed toward the edges, is equal to the shape of the edges of the cutter to be manufactured, when viewed on the plane thereof. FIG. 20 is a view enlarging the shape of the edges of the cutter wherein the bent portions 336b and 336c of the edge 336a are not rounded but pointed. The cutter 307 (refer to FIG. 19) manufactured by the cutter blade 336 can have the edges 307a and 307b which are not rounded but pointed.

In FIGS. 17 and 18, the receiving roller 340 has a receiving member 338 provided with a flat receiving surface 338a for receiving the cutter blade 336 and a plurality of suction holes 339 for sucking and holding the cutter 307 which is to be severed by the cutter blade 336. "The receiving surface 338a of the receiving roller 340 is flat" means that the receiving surface 338a has no grooves through which the cutter blade 336 is inserted. Accordingly, the receiving surface 338a is not flat in a strict sense but may be cylindrical surface. The cutter roller 337 and the receiving roller 340 are synchronously rotated in the manner that the tip end of the cutter blade 336 and the receiving surface 338a move at the same speed. The cutter roller 337 and the receiving roller 340 feed the sheet 335 at the same speed as that of the tip end of the cutter blade 336 and the cutter blade 336 cuts in the sheet 335 which is supported by the receiving surface 338a whereby the sheet 335 can be severed in the shape of the edges of the cutter, i.e. the shape of sawtooth to thereby form the cutter 307. The receiving roller 340 functions to suck and hold the cutter 307, which is severed from the sheet 335, by the suction holes 339. The receiving roller 340 is hereinafter referred to as a suction roller. It is preferable to provide an elastic member 341 such as a sponge, if need be, downstream the cutter blade 336 of the cutter roller 337. The elastic member 341 prevents the portion of the sheet 335 to be severed by the cutter blade 336 from pasting to the cutter roller 337.

In FIG. 18, the distance between the center of the cutter roller 337 and that of the suction roller 340 may be determined in the manner that the edges strikes surely against the receiving surface 338a to thereby sever the sheet 335 with assurance when the cutter blade 336 faces perpendicular to the receiving surface 338a (at the time of severing the sheet). However, according to the third embodiment, this distance is determined in the manner that a microscopic clearance d is left between the edges of the cutter blade 336 and the receiving surface 338a. The clearance d is preferable to range from 0.005 mm to 0.03 mm, particularly preferable to be 0.01 mm. Since the edges of the cutter blade 336 do not contact the receiving 338a as set forth above, even if the cutter blade 338a strikes against the receiving surface 338a which is normally formed of a hard metal, there is no likelihood that the cutter blade 336 is damaged or worn whereby the life of the cutter blade 336 can be lengthened. Provision of such a microscopic clearance d between the cutter blade 336 and the receiving surface 338a does not assure that the cutter blade 336 severs the sheet 335 completely when the former cuts in the latter, which results in that the tip portion of the sheet which was cut in remains connected to the sheet 335 within a hairbreadth as a thin skin. However, if the tip portion of the sheet 335 which was cut in, i.e. the tip portion of the sheet to form the cutter 307 is sucked and held by the suction roller 340 and at the same time if a sheet feeding device 343, described later, breaks the sheet 335 tensile strength is generated between the sheet 335 and the cutter 307. The thus generated tensile strength tears off the thin skin which remains between the cutter blade 336 and the sheet 335 so that the cutter 307 can be severed from the sheet 335 without any obstacle. The suction roller 340 is disposed at the position where the cutter 307, which is sucked and held by the suction roller 307, is pasted to the carton which is conveyed by the conveyed device 310 as illustrated in FIGS. 15 and 16.

The cutter manufacturing and pasting device 333 further includes a winder 342 for feeding the sheet 335 and a sheet feeding device 343 for feeding the sheet 335 in a given pitch to thereby supply the sheet 335 between the cutter roller 337 and the suction roller 340. The sheet feeding device 343 feeds the sheet at the speed synchronous with the speed of the rotation of the edges of the cutter blade 336 so that the sheet can be severed by the cutter blade 336 at a given position remote from the tip end of the sheet. After the sheet 335 is severed by the cutter blade 336, the sheet feeding device 343 has such a function that it brakes the sheet to stop its movement and thereafter pulls back the sheet 335 so that the tip end of the sheet 335 is returned to its given position. With such an arrangement, it is possible to feed the sheet 335 every given pitch and sever the sheet 335 at the given pitch from the tip portion of the sheet 335 by the cutter roller 337 and the suction roller 340.

An inspecting device 345 is provided downstream the cutter manufacturing and pasting device 333. The inspecting device 345 has three cameras for observing a given position of the upper surface of the carton 302. There are three observation positions, i. e., first to three observation regions 346 to 348. The first observation region 346 is observed by the first camera having a detecting line where the arrival of the tip end of the carton 302, which is fed in the direction of the arrow, is detected.

The second observation region 347 is observed by the second camera having detecting lines 347a and 347b where the surface of the carton 302 16 ahead the cutter 307 is detected. The third observation region 348 is observed by the third camera having detecting lines 348a and 348b where the surface of the cutter 307 is detected. That is, the second and third observation regions 347 and 348 are arranged on the surface of the carton 302 so as to observe the two points which are spaced in the width direction of the carton 302. The positions of and intervals between the forward detecting lines 347a, 348a and the backward detecting lines 347b and 348b are determined in the manner that the carton surface is detected by the forward detecting lines 347a and 348a and the surface of the cutter 307 is detected by the rearward detecting lines 347b and 348b at the timing when the cutter 307, which is attached to the carton within the tolerable attaching accuracy, arrives the given position. One or both of the surfaces of the carton 302, which is positioned close to the position when the cutter is attached to the carton, and the surface of the cutter 307 are appropriately put into print so that they have different reflectance in order to identify the surface of the carton 302 and the surface of the cutter 307.

When the carton having the cutter 307 pasted thereon is fed in the direction of the arrow, the inspecting device 345 firstly detects the arrival of the carton 302 based on the output of the first camera at the first line 346a and secondly measures the timing when the cutter 307 arrives the second and third observation regions based on the detected arrival of the carton 302 and thirdly compares the output of the second camera at the detecting lines 347a and, 347b with the output of the third camera at the detecting lines 348a and 348b, whereby the inspecting device 345 can detect as to whether the cutter 307 is attached to the carton 302 within the tolerable attaching accuracy.

In FIG. 15, there are provided a stacker 350 for stacking therein the carton 302 which is discharged from the belt with pins 313, a shutter 351 for temporarily receiving the carton 302 which is discharged from the belt with pins 313, an inferior good receiver and a shutter 353 for directing the inferior goods to the inferior good receiver 352.

The feeder suction device 305 of the carton feeder 301, the form cylinders 326 and 328 of the pasting device 320, the cutter roller 337 of the cutter manufacturing and pasting device 333 and the driving mechanism of the suction roller 340 are respectively structured to be synchronous with the driving mechanism of the belt 313. With such a synchronous mechanism, the feeder suction 305 can supply the carton 302 to the belt 313 at the given position relative to the pin 313a of the belt 313 and the pasting device 320 and the cutter manufacturing and pasting device 333 can apply the adhesive paste to the carton 302 which is conveyed while it contacts the pin 313a of the belt 313 at the rear end thereof and can supply the cutter 307. The adhesive paste supply roller 324 of the emulsion pasting device 321 is connected to an exclusive motor which can rotate the past supply roller 324 even if the cutter manufacturing and attaching apparatus is stopped.

An operation of the cutter manufacturing and attaching apparatus will be described hereinafter.

The belt 313 and the vacuum suction belt 314 of the conveying device 310 are continuously traveling in the direction of the arrow A. The feeder suction 305 of the carton feeder 301 feeds the cartons 302 one by one at the constant timing onto the belts 313 and 314 at the position slightly before the pins 313a. The carton 302 is sucked and held by the vacuum suction belt 314 and conveyed forward to the pasting device 320. The pin 313a of the belt 313, which travels faster than the vacuum suction belt 314, catches up with the rear end of the carton 302 before the carton 302 reaches the pasting device 320, whereby the carton 302 travels on the belt 313 while it is pushed by the pin 313a. Accordingly, the carton 302 is fed toward the pasting device 320 and passes thereunder at the state where it is positioned at the given position relative to the belt 313.

The adhesive paste is applied to the carton 302 from one of the emulsion pasting device 321 and the hot melt pasting device 322 which constitute the pasting device 320. At this time, since the form cylinders 326 and 328 are rotated in synchronism with the belt 313, they can apply the adhesive paste to the carton 302, which is conveyed by the belt 313 at the given position of the carton 302. Accordingly, the adhesive paste can be applied to the pasting position 306 of the carton 302 as illustrated in FIG. 22.

The carton 302 to which the adhesive paste is applied passes under the cutter manufacturing and pasting device 333. At this time, since the cutter roller 337 and the suction roller 340 are synchronously rotated in the direction of the arrow, the tip end of the sheet 335 which is inserted therebetween, is sucked and held by the suction hole 339 of the suction roller 340 and the portion behind the tip end of the sheet 335 is clamped by the cutter blade 336 and the receiving member 338 and is severed by the cutter blade 336, whereby the cutter 307 having sharp edges can be formed (refer to FIG. 18). Thereafter, the severed cutter 307 is conveyed by the rotation of the suction roller 340 while it is held by the suction roller 340 and is successively supplied to the pasting portion of the carton which passes under the severed cutter 307 and is pasted on the pasting portion. Since the suction roller 340 is also rotated in synchronism with the belt 313, the severed cutter 307 can be supplied to the carton 302 at the given position thereof whereby the severed cutter 307 can be pasted to the carton at the accurate position thereof.

Thereafter, the carton to which the cutter 307 is pasted is conveyed downstream by the belt 313 toward the inspecting device 345 where the pasting position of the cutter 307 is inspected. The good cutter 307 is accumulated in the stacker 350. If there is any anomaly, i.e., defect in the carton 302, the shutter 353 moves upward to thereby discharge the inferior carton 302 to the inferior receiver 352.

As the operations set forth above continue, the cutter 307 which is formed by cutting the sheet is successively pasted to the successively conveyed carton 302 is successively conveyed.

Figure 24:
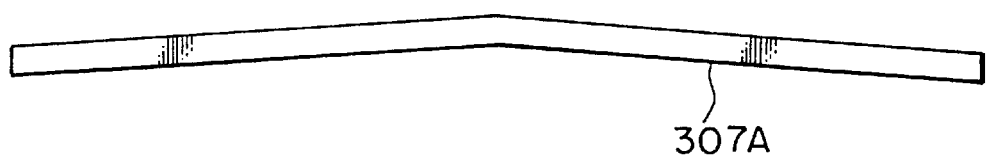
FIG. 24 is a plan view of a modification of the cutter.

In the third embodiment, the straight cutter 307 is pasted to the outer surface side of the carton, at the state where the carton is assembled in the box-shape. However, the cutter manufacturing and attaching apparatus is not limited to the third embodiment but it can be used for manufacturing and attaching the cutter 307A having a slightly bent in L-shape, as illustrated in FIG. 24, to the carton. In this case, the shape of the cutter blade 336 of the cutter roller 337 may be changed. It is also possible to attach the cutter to the inner surface of the carton. In this case, the carton may be supplied to the conveying device 310 in the manner that the carton is turned the inner surface out.

Furthermore, in the third embodiment, the sheet is cut in the width direction from the tip end thereof to thereby form the cutter. However, the method of manufacturing the cutter according to the present invention is not limited to this but it is applied to such a case that the sheet is severed in the longitudinal direction thereof in a given width to thereby form the cutter. In this case, a plurality of cutter blades may be provided radially on the cutter roller and dispposed axially in a given interval and a plurality of receiving surfaces may be provided on the receiving roller at the positions corresponding to the cutter blades of the cutter roller.

According to the method of manufacturing the cutter, since the cutter blade of the cutter roller having edges which are equal to those of the cutter to be manufactured cuts in the sheet and severs the sheet which is travelled and supported by the receiving surface of the receiving roller, the sheet can be severed accurately in conformity with the edges of the cutter blade. If the edges of the cutter blade are pointed, it is possible to manufacture the cutter having no rounded portion at the edges thereof. It is also possible to manufacture the sharp cutter from the sheet. Still furthermore, since the sheet is severed by the roller so as to form the cutter when the latter is rotated, a production speed can be increased to thereby increase the productivity.

According to the cutter manufacturing and attaching apparatus, there are following advantages. The adhesive paste can be applied to the carton at the given position thereof while the latter is continuously fed by the conveying device, and the cutter is severed from the sheet and the severed cutter can be pasted onto the pasted position of the carton, whereby the carton having the cutter attached thereto can be effectively manufactured. Furthermore, since the cutter is processed by the rotary cutter system, the edges of the cutter are pointed to thereby realize a sharpness.

Fourth Embodiment (FIGS. 25 to 33)

An apparatus for manufacturing a cutter manufacturing and attaching apparatus will be described with reference to FIGS. 25 to 31.

Figure 25:
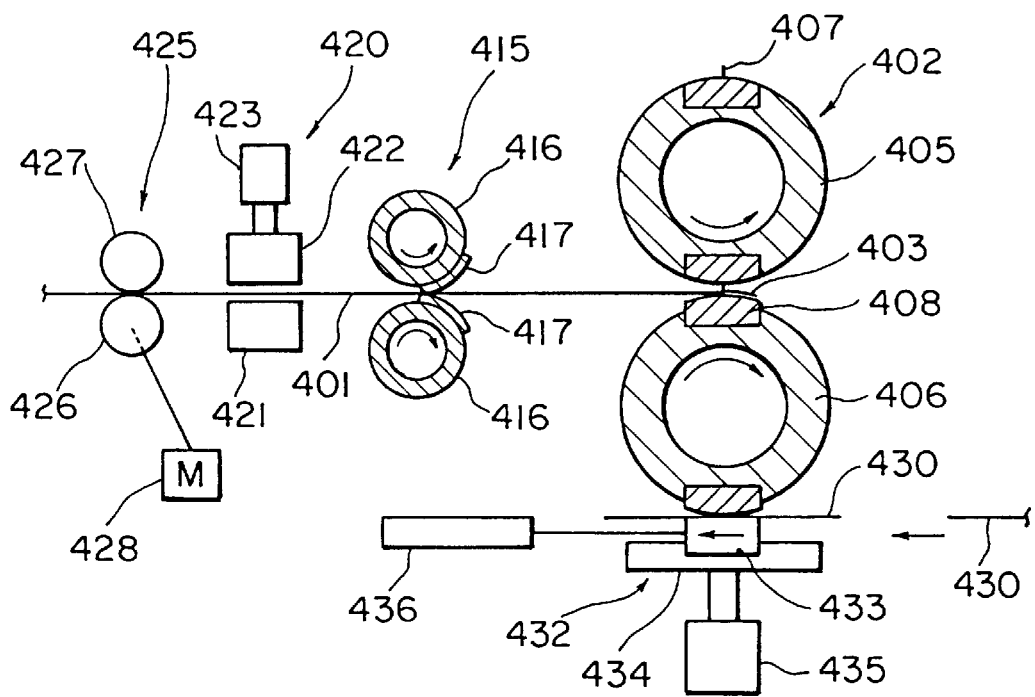
FIG. 25 is a side view of a cutter manufacturing and attaching apparatus according to a fourth embodiment.
Figure 26:
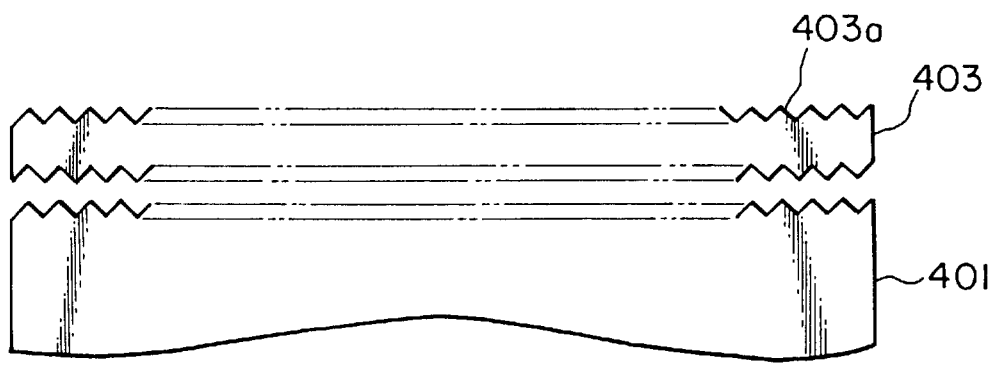
FIG. 26 is a plan view showing edges of a cutter which is formed by cutting the tip portion of a sheet and the tip end of the sheet.

In FIG. 25, a sheet 401 for forming a cutter is drawn out from a winder, not shown. A rotary die cutter 402 manufactures the cutter 403 having edges at both ends thereof, as illustrated in FIG. 26, by severing the tip portion of the sheet 401 zigzag. The width of the cutter 403, i.e., the interval between each of the edges 403a, 403a of the cutter 403 to be manufactured in the fourth embodiment is very small, namely, it ranges from 5 to 10 mm.

The rotary die cutter 402 comprises a cutter cylinder 405 and a receiving cylinder 406 which are disposed in parallel with each other and a driving device, not shown, for synchronously rotating these cylinders in opposite directions. The cutter cylinder 405 has a cutter blade 407 which is disposed on the outer peripheral surface thereof at the position spaced at an angular interval of 180° and is extended in the axial direction thereof.

Likewise, the receiving cylinder 406 has a receiving table 408 which is disposed on the outer peripheral surface thereof at the position spaced at an angular interval of 180° and is extended in the axial direction thereof. The tip end of the cutter blade 407 and the outer peripheral surface of the receiving table 408 are positioned on the circumferences of the cylinders having the same diameters. Accordingly, when the cylinders 405 and 406 are synchronously rotated, the tip end of the cutter blade 407 and the outer peripheral surface of the receiving table 408 move at the same speed whereby the sheet 401 can be severed well by the cutter 407 and the corresponding receiving table 408.

Figure 27:
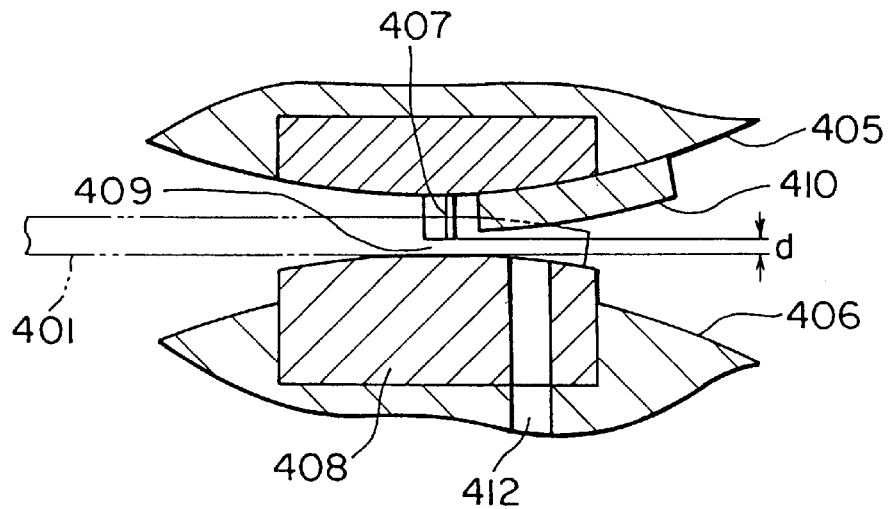
FIG. 27 is an enlarged cross-sectional view showing a main portion of a rotary die cutter of the cutter manufacturing and attaching apparatus according to the fourth embodiment.

The distance between the center of the cutter cylinder 405 and that of the receiving table 406 is determined so as to leave a microscopic clearance therebetween when the cutter blade 408 faces perpendicular to the receiving table 408, i.e., at the time of severing the sheet as enlarged in FIG. 27. Supporting the length of the clearance is d, it is preferable to range from 0.005 mm to 0.03 mm, particularly preferable to be 0.01 mm. Since the clearance d is left between the cutter blade 407 and the receiving table 408, the edges of the cutter blade 407 is prevented from striking against the hard receiving table 408 and from being damaged or worn whereby the life of the cutter blade 407 is lengthened.

Figure 28:
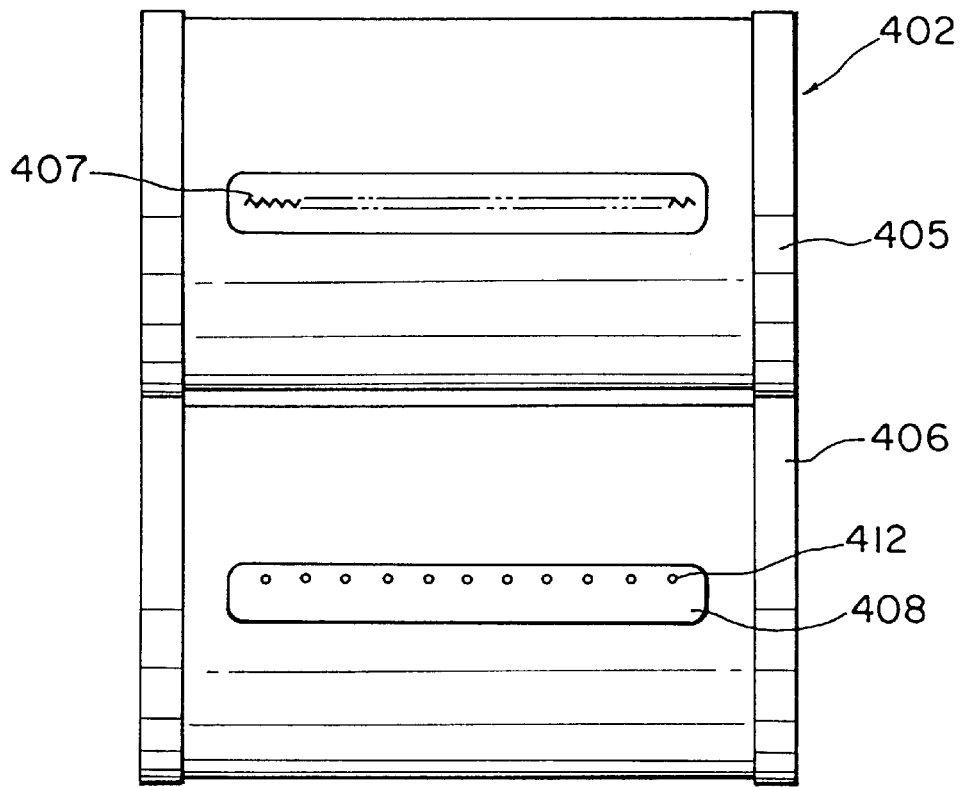
FIG. 28 is a front view of the rotary die cutter.
Figure 29:
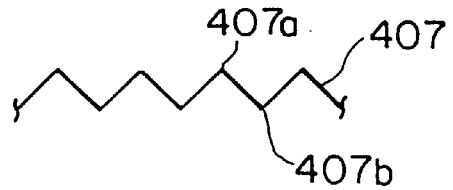
FIG. 29 is a plan view enlarging the edges of the cutter of the rotary die cutter.

The shapes of the edges of the cutter blade 407 are zigzag as illustrated in FIGS. 28 and 29 so as to give the cutter of the severed sheet zigzag edges, as illustrated in FIG. 26. The bent portion of the edges 407a and 407b are not rounded but pointed. With such an arrangement of the cutter blade 407, the edges 403a of the cutter 403 are not rounded but pointed.

The cutter blade 407 extends in the longitudinal direction of the cutter cylinder 405, wherein "extends in the longitudinal direction of the cutter cylinder" include "extends aslant relative to the axial direction of the cutter cylinder 405" in addition to "extends in parallel with the axial direction of the cutter cylinder 405". Accordingly, the cutter blade 407 is not always provided in parallel with the axial direction of the cutter cylinder 405 but may be inclined relative to the axial direction of the cutter cylinder 405 or may be bent like a V-shape. It is preferable to provide an elastic member 410 downstream the cutter blade 407, if need be. The elastic member 410 prevents the cutter which is severed from the cutter blade 407 from pasting to the cutter cylinder 405.

The receiving table 408 of the receiving cylinder 406 supports the sheet to be severed by the cutter blade 407 and is normally formed of a hard metal. Since the cutter blade is provided not to directly contact the receiving table 408, there is no likelihood that the tip end of the cutter blade 407 strikes against the receiving table 408 to thereby be damaged or worn even if the receiving table 408 is formed of the hard metal. The receiving table 408 has a plurality of suction holes 412 at the position downstream (right side in FIG. 27) the position confronted with the cutter blade 407 and a vacuum supply source, not shown, is connected to the suction holes 412 by way of a valve. The valve is structured to apply negative pressure to the suction holes 412 until the suction holes which are directed upward where they contact the sheet are turned 180° so as to be directed downward, whereby the suction holes 412 suck and hold the sheet which is severed by the cutter blade 407 and can carry the sheet downward. Accordingly, the mechanism to apply negative pressure to the suction holes 412 so that the latter operates under the vacuum condition constitutes a suction means for sucking and holding the severed sheet.

According to the fourth embodiment, the cutter cylinder 405 has two cutter blades 407 and the receiving cylinder 406 has two receiving tables 408 as illustrated in FIG. 25 whereby the sheet is severed two times by the cutter blade 407 when the cutter cylinder 407 and the receiving table 408 make one rotation. However, the number of the cutter blade 407 and the receiving table 408 can be appropriately increased or decreased, for example, the cutter blade 407 and the receiving table 408 may sever the sheet one time or more than three times when the cylinders 405 and 406 make one rotation.

A conveying device 415 as illustrated in FIG. 25 feeds the sheet 401 to the rotary die cutter 402. The conveying device 415 comprises a pair of feeding cylinders 416 and 416 which are synchronously driven to rotate in the opposite directions. The feeding cylinders 416 and 416 have respectively cylindrical feeding surfaces 417 and 417 on the outer peripheral surfaces thereof at the part of the circumferential region of the outer peripheral surface thereof wherein the cylindrical feeding surfaces 417 and 417 nip and convey the sheet. The diameter of the cylindrical feeding surface 417 is half of that of the circle which is drawn by the tip end of the cutter blade 407 of the cutter cylinder. The feeding cylinder 416 is structured to be driven to rotate in synchronism with the cutter cylinder 405 so that the former is made one rotation while the latter is made half rotation. Accordingly, the feeding surfaces 417 and 417 of the pair of the feeding cylinders 416 and 416 can feed the sheet 401 between the cutter cylinder 405 and the receiving cylinder 406 of the rotary die cutter 402 at the speed synchronous with the speed of the cutter blade 407. The diameter of the feeding surface 417 of the feeding cylinder 416 is not limited to half of that of the circle which is drawn by the cutter blade 407 of the cutter cylinder 405 but may be equal to that, that multiplied by an integer, or that divided by an integer.

Figure 30A:
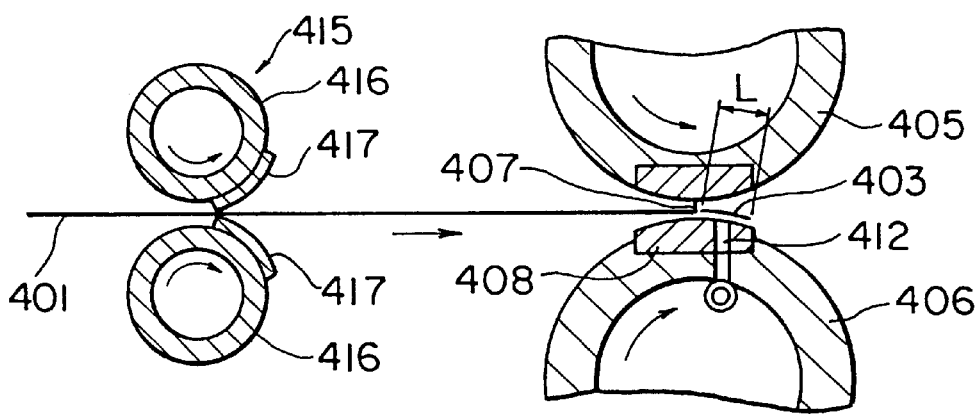
FIG. 30(a) is a cross-sectional view of the rotary die cutter and a conveying device of FIG. 25 at the standby state where the sheet is cut.

The phase of the feeding cylinder 416 (corresponding to the position of the feeding surface 417) is positioned where the cutter blade 407 of the rotary die cutter 402 crosses perpendicular to the receiving table 408 immediately after the completion of nipping of the sheet 401 by the feeding surfaces 417 and 417 and it is determined so as to cut in deep the sheet 401 as illustrated in FIG. 30(a).

A stopper 420 temporarily stops the sheet 401 and comprises a fixed table 421 and a movable table 422 which are disposed to intervene the sheet 401 therebetween and a driving device 423 for moving the movable table 422 as illustrated in FIG. 25. The stopper 420 is controlled to operate and stop the movement of the sheet 401 temporarily immediately after the rotary die cutter 402 severs the sheet 401.

An inverting device 425 is disposed upstream the stopper 420. The inverting device 425 comprises a driving roller 426 and a pinch roller 427. The driving roller 426 is connected to a servomotor 428 by way of a clutch, not shown. The clutch and the servomotor 428 start to operate to drive the driving roller 426 in the direction to pull the sheet backward immediately after the rotary die cutter 402 severs the sheet 401 for pulling the tip portion of the sheet 401 back to the given position. The driving roller 426 is connected to a measuring means, not shown, which measures the number of rotation of the driving roller 426 to thereby measure the feeding amount and the amount of pulling back the sheet 401. A signal issued by the measuring means is used for controlling the servomotor 428. The inverting device 425 and the conveying device 415 constitute a sheet conveying and inverting device for feeding the sheet 401 between the cutter cylinder 405 and the receiving cylinder 406 of the rotary die cutter at the speed synchronous with that of the cutter blade 407 and pulling back the sheet after the sheet 401 is severed.

An application device 432 is provided under the receiving cylinder 406 for attaching the cutter 403 which is sucked and held by the receiving cylinder 406 to the carton 430 which is fed in synchronism with the rotation of the receiving cylinder 406. The application device 432 comprises a supporting table 433 for supporting the lower surface of the carton 430 to be fed, a rail 434 for horizontally and slidably holding the supporting table 433, an air cylinder 435 for raising and lowering the rail 434 and an air cylinder 436 having a spring which is connected to the supporting table 433. The air cylinder 436 serves as an shock absorber of the supporting table 433 at the time of movement of the supporting table 433 as the receiving cylinder rotates when the supporting table 433 is pressed toward the receiving cylinder 406 and also serves to restore the supporting table 433 to the original position when the supporting table 433 is moved away from the receiving cylinder 406.

An operation of the fourth embodiment will be described hereinafter.

Figure 30B:
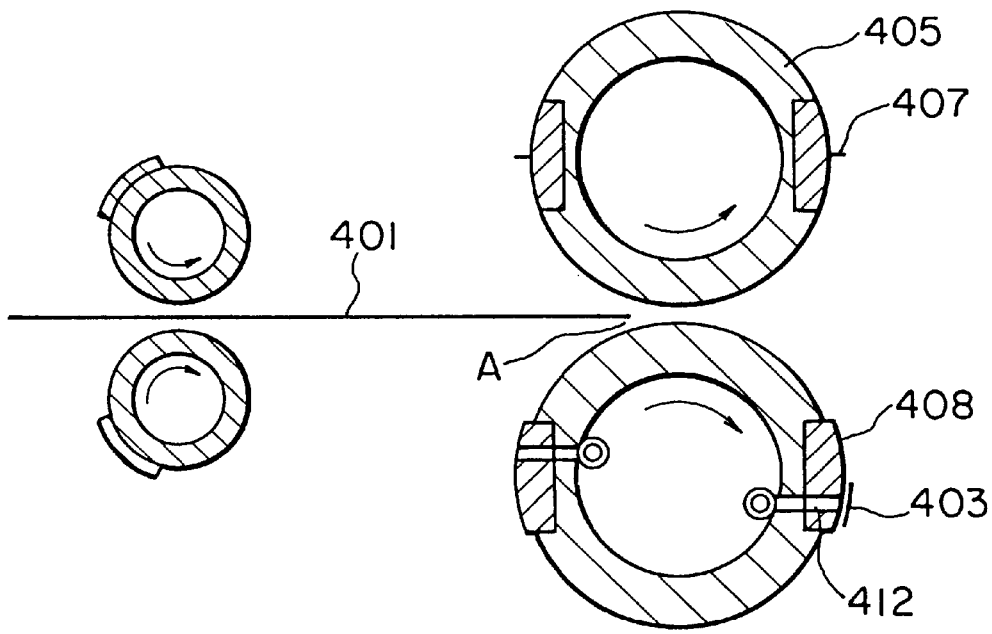
FIG. 30(b) is a cross-sectional view of the rotary die cutter and the conveying device of FIG. 25 at the state before the sheet is cut.

The cylinders 405 and 406 of the rotary die cutter 402 and the feeding cylinders 416 and 416 of the conveying device 415 are always synchronous with each other to rotate in the direction of the arrow. Suppose that the tip portion of the sheet 401 is stopped at a given starting point A as illustrated in FIG. 30(b). If the feeding surfaces 417 and 417 are moved to the position to nip the sheet 401 when the feeding cylinders 416 and 416 are rotated, the feeding surfaces 417 and 417 nip the sheet 401 and start to convey the sheet 401 and thereafter insert the tip portion of the sheet 401 between the cutter cylinder 405 and the receiving cylinder 406. At the time when the tip portion of the sheet 401 is fed by the feeding cylinders 416 and 416 and the feeding surfaces 417 and 417 release the nipping of the sheet 401 as illustrated in FIG. 30(a), the cutter blade 407 of the rotary die cutter 402 cuts in the sheet 401 at the position remote from the tip end thereof by the given length L. At this time, since the sheet 401 is conveyed by the feeding cylinders 416 and 416 at the same speed as the cutter blade 407, the cutter blade 407 cuts in the tip portion of the sheet 401 accurately to thereby cut the sheet 401 in the same shape as the cutter blade 407. However, the tip portion of the sheet 401 is not completely severed by the tip end thereof but it remains connected to the sheet 401 as a thin skin.

At the time when the cutter blade 407 cuts in the sheet 401, negative pressure is applied to the suction holes 412 of the receiving tables 408 so that the vacuum holes suck and hold the sheet 401 positioned thereover (the portion to be formed as the cutter 403). Successively, the stopper 402 operates to thereby glip the sheet 401 and stops the sheet 401. Meanwhile, since the receiving cylinder 406 which sucks and holds the tip portion of the sheet 401 keeps to rotate, tensile strength is generated between the cutter 403 and the stopped sheet 401 so that the thin skin remained connected between the cutter 403 and the stopped sheet 401 is torn off. As a result, the cutter 403 is severed from the tip portion of the sheet 401. The stopper 420 serves to sever the cutter 403 from the tip portion of the sheet 401 and also serves to reduce the amount of feeding of the sheet 401 owing to the inertia.

Thereafter, the gripping of the sheet 401 by the stopper 420 is released and the inverting device 425 operates to thereby pull back the sheet 401 and position of the tip portion of the sheet 401 at the original position A as illustrated in FIG. 30(b). Accordingly, the apparatus is ready for the next operation.

Figure 31:
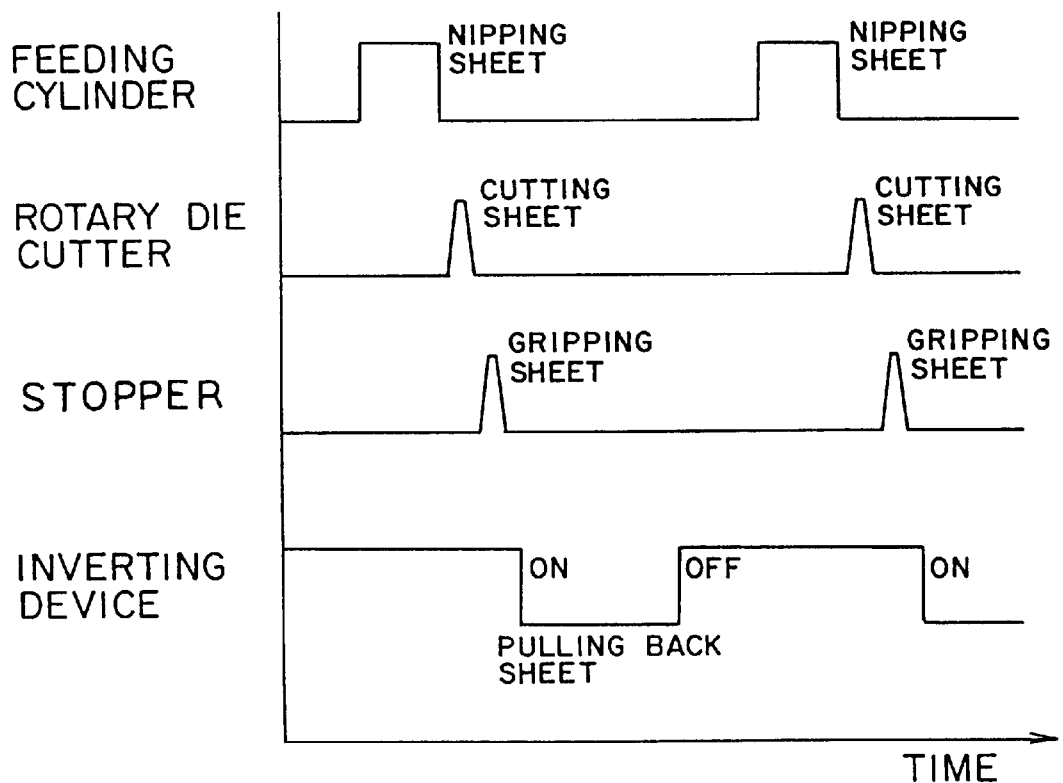
FIG. 31 is a timing chart showing the operation of the components of the apparatus of FIG. 25 when the sheet is cut.

FIG. 31 is a timing chart showing the operations set forth above.

Meanwhile, the receiving cylinder 406 which sucks and holds the cutter 403 keeps to rotate and conveys the cutter held thereby to the lower direction. The carton 430 is conveyed toward the receiving cylinder 406 by a conveying device, not shown. The adhesive paste is applied to the sheet 401 at the portion to be pasted on the way toward the receiving cylinder 406 and is then fed onto the supporting table 433 in a given timing. At this time, the supporting table 433 is stand by at the lowered position. At the time when the carton 430 is fed onto the supporting table 433 and the cutter 403, which is held by the receiving cylinder 406, is fed onto the carton 430, the air cylinder 435 pushes up the rail 434 and raises the supporting table 433. As a result, the carton 430 held by the supporting table 433 is pressed against the cutter 403 so that the cutter 403 is pasted to the carton 430. At this time, since the supporting table 433 moves in the same direction of the carton 430 as the carton 430 and the receiving cylinder 406 move, pressure application between the cutter 403 and the carton 430 is balanced, which entails the improvement of the pasting accuracy. After the completion of the attachment of the cutter 403 to the carton 430, the rail 434 is lowered to thereby move the supporting table 433 away from the receiving cylinder 406 and the air cylinder 436 restores the supporting table 433 to the original position. Accordingly, the apparatus is ready for the next operation.

With the repetition of the operations as set forth above, the tip portion of the sheet 401 is severed every given length L to thereby form the cutter. The cutter is then pasted to the carton 430. In order to change the severing length L, the stop position (the original position A as illustrated in FIG. 30(b)) of the tip portion of the sheet 401 when it is pulled back by the inverting device 425 may be changed.

In the fourth embodiment, the cutter 401 does not contact with the receiving table 408 and the sheet 401 is cut at the top portion thereof while the top portion remains connected to the sheet as the thin skin. However, the sheet 401 may be completely severed by the cutter blade 407. In this case, the stopper 420 may be omitted. If the stopper 420 remains provided, there is an advantage that the stopper 420 can stop the advancement of the sheet 401 so that the amount of pulling back the sheet 401 by the inverting device 425 is reduced.

Furthermore, according to the fourth embodiment, the sheet conveying inverting device comprises the conveying device 415 for feeding the sheet 401 between the cutter cylinder and the receiving cylinder of the rotary die cutter at the speed synchronous with that of the cutter blade and the inverting device 425 which is provided separately from the conveying device 415. However, the present invention is not limited to this arrangement and may adopt the device which functions as the conveying device for feeding the sheet and also as the inverting device for pulling back the sheet. For example, the inverting device 425 serves as the conveying device 415 in the manner that the driving roller 426 is driven in both the normal and reverse directions as the driving speed is controllable. In this case, the feeding, stopping and reversing functions may be controlled electrically by the servomotor, etc. or mechanically by the clutch, brake, etc.

Although the tip portion of the sheet is severed zigzag for forming the cutter, it may be severed for forming the member for other purposes. The rotary die cutter 402 may have the blade for punching the sheet, or the blade for cutting in the sheet as well as the blade for severing the sheet as set forth above.

As mentioned above, since the sheet is fed between the cutter blade of the cutter cylinder and the receiving table of the receiving cylinder at the speed synchronous with the moving speed of the cutter blade and the cutter blade cuts in the sheet which is supported by the receiving table and severs sheet, the productivity is improved and the sheet can be severed accurately in the shape of the cutter blade. For example, if the edges of the cutter blade is zigzag so as to form the cutter zigzag, so that the edges having no rounded portion can be formed. Furthermore, since the tip portion of the sheet is pulled back by the sheet conveying inverting device after the sheet is severed, it is possible to sever the sheet at the portion remote arbitrarily from the tip end thereof, whereby the cutter having the narrow width can be formed.

Still furthermore, since the conveying device comprises a pair of feeding cylinders each having a cylindrical feeding surface on the part of the region of the circumferential direction of the outer peripheral surface thereof, the feeding cylinder of the conveying device is allowed to rotate in synchronism with each cylinder of the rotary die cutter and the tip end of the sheet is positioned at the given position whereby the sheet can be nipped and conveyed by the feeding surfaces of the pair of feeding cylinders and is fed so as to contact the cutter blade at the given position from the tip end thereof at the speed synchronous with the cutter blade. Consequently, the sheet can be fed into the rotary die cutter by the simple structured controller.

Still furthermore, since the microscopic clearance is left between the tip end of the cutter blade and the receiving table at the time of severing the sheet, there is no likelihood that the edges of the cutter blade strikes against the receiving table to thereby be worn whereby the life of the cutter blade is lengthened. At this time, even if the cutter blade cuts in deep the cutter blade, the sheet is not completely severed and the cut sheet remains connected to the sheet as the thin skin. However, since the apparatus is structured that the tip portion of the sheet to be severed is sucked and held by the receiving cylinder and the sheet opposite to the tip portion may be stopped by the stopper device, the portion remains uncut by the cutter blade is torn off and severed with assurance, which does not cause any obstacle.

Figure 32:
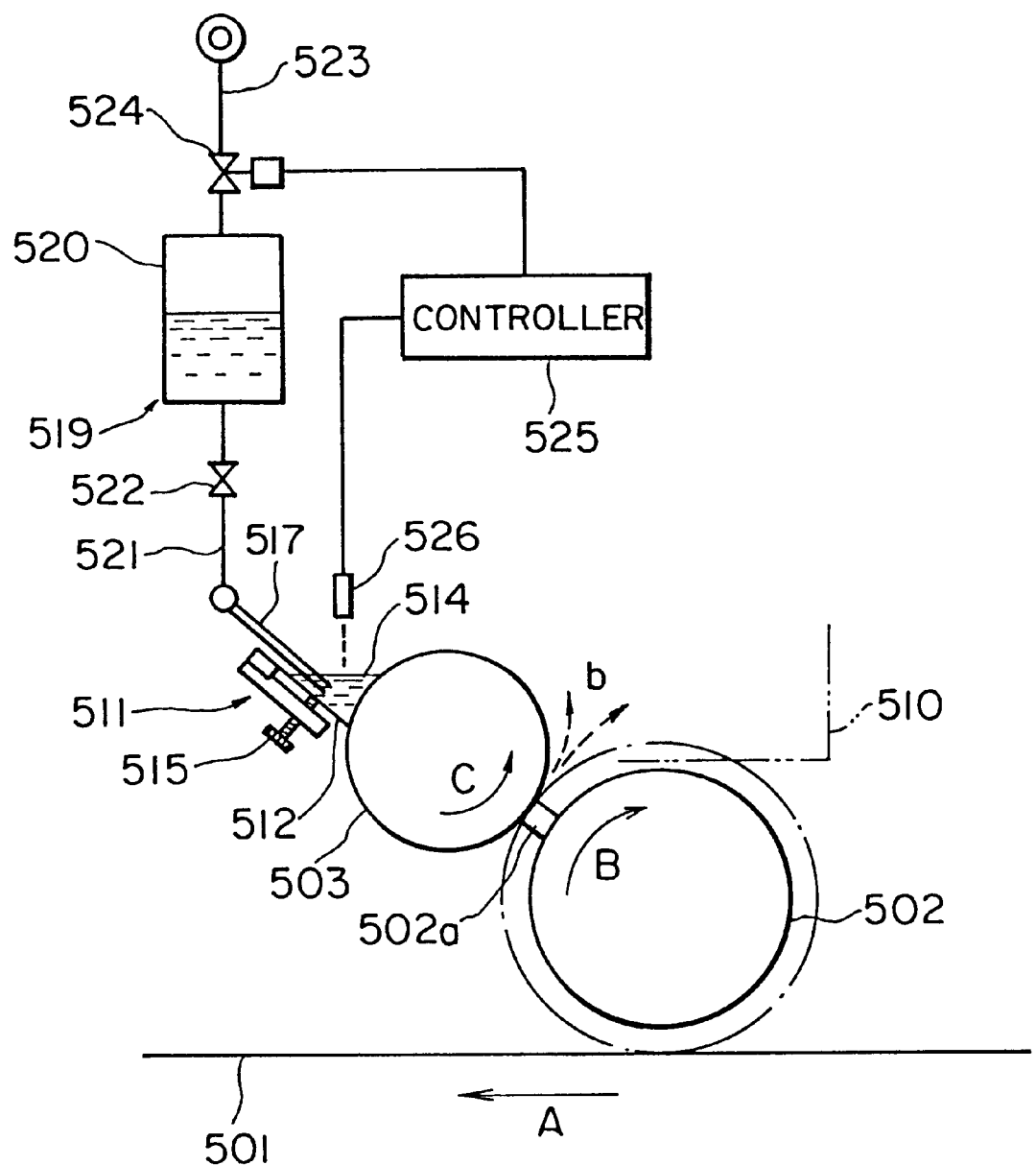
FIG. 32 is a schematic side view of a preferred pasting device which is employed in the cutter manufacturing and attaching apparatus of FIG. 25.
Figure 33:
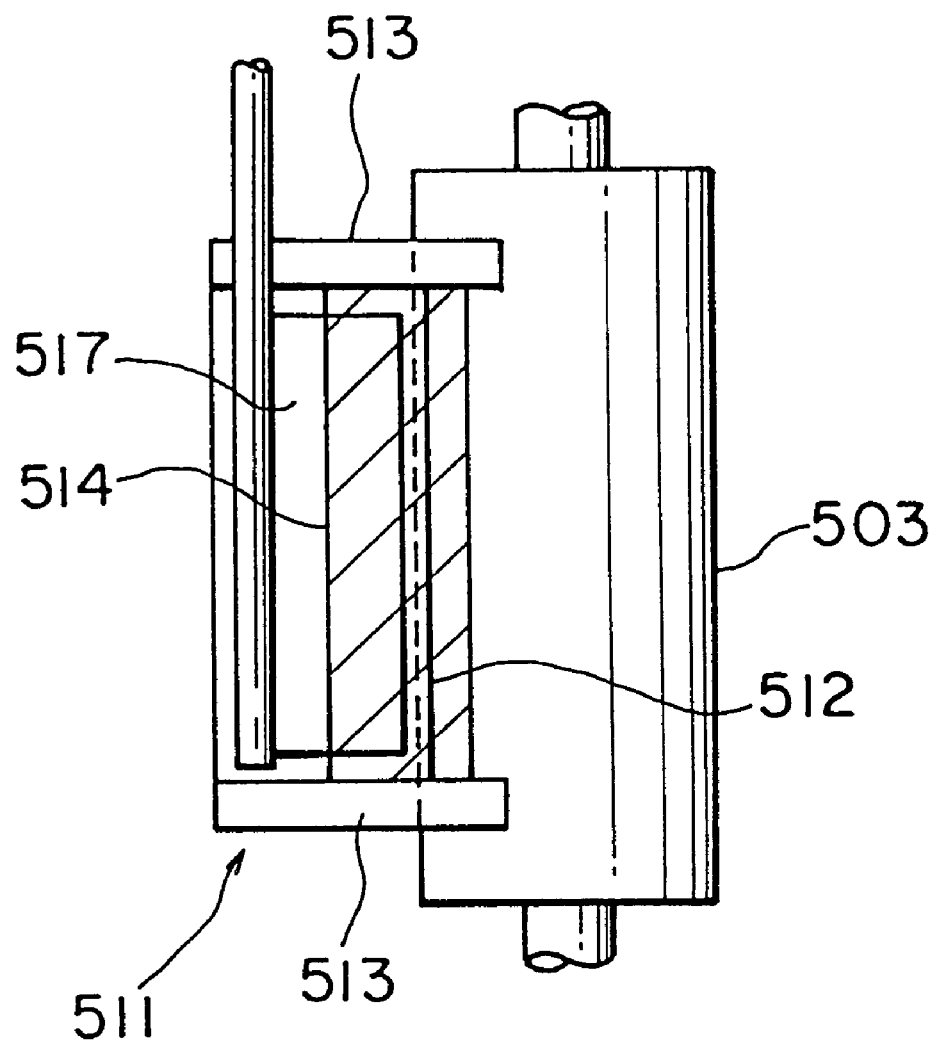
FIG. 33 is a schematic plan view of the pasting device.

The pasting device for use in the cutter manufacturing and attaching apparatus will be described with reference to FIGS. 32 and 33.

An object 501 to be pasted is travels in the direction of the arrow A by a conveying device, not shown. A form plate roller 502 applies an adhesive paste to the object 501 at the given position thereof and has a convex portion 502a for pasting the adhesive paste to the object 501. The form roller 502 is rotated in synchronism with the travelling of the object 501. A material for the form plate 502 is preferable to be subjected to tough ram process or an aluminum letterpress, etc. As the material of the form plate material, metal having less affinity for the adhesive paste such as a chrome-plated iron member or a resin such as a tetrafluoroetylene may be used.

A paste supply roller 503 supplies the adhesive paste to the form plate roller 502. The diameter of the paste supply roller 503 is less than that of the form plate roller 502. The adhesive paste stuck to the peripheral surface of the paste supply roller 503 is prevented from drying. The ratio of the diameter of the paste supply roller 503 relative to the form plate roller 502 is expressed as the ratios of whole numbers whereby the contact position of the paste supply roller relative to the convex portion 502a of the form plate roller 502 is changed, the quality of the adhesive paste to be applied to the convex portion 502a is stabilized and the surface of the paste supply roller 503 is prevented from wearing locally. Furthermore, the paste supply roller 503 is disposed at the front of the form plate roller 502. With such an arrangement, the adhesive paste is scattered when the paste supply roller 503 is moved away from the convex portion 502a of the form plate roller 502 in the direction opposite to the object 501 and the coneying device of the object 501 as shown in the arrows b, so that these elements are not contaminaated. A paste receiver 510 may be provided over the form plate roller 502 for receiving the adhesive paste scattered upward the form plate roller 502. A vacuum device, etc. may be provided instead of the paste receivier 510 for sucking the scattering paste.

A paste tray 511 supplies the adhesive paste to the paste supply roller 503 and comprises a doctor 512 which is pressed toward the paste supply roller 503, side blocks 513, etc. The paste is stored between the doctor 512 and the paste supply roller 503. The doctor 512 is pressed toward the paste supply roller 503 by an adjusting screw 515. The amount of the adhesive paste to be stuck to the circumference of the paste supply roller 503 can be finely adjusted by adjusting the adjusting screw. The paste tank may comprise more than two rollers.

A paste supply nozzle 517 supplies the adhesive paste to the paste tray 511. The paste supply nozzle 517 is provided so that it is soaked into the adhesive paste which is stored in the paste tray 511 at the tip end thereof. Accordingly, even if the flow of the adhesive paste in the paste supply nozzle 517 is soaked, there is no likelihood that the adhesive paste in the paste supply nozzle 517 contacts air to thereby be dried, which does not make the paste supply nozzle clog. The paste supply nozzle 517 is connected to a past supply means 519 for supplying the adhesive paste thereto. The paste supply means 519 comprises an airtightly structured paste tank 520, a pipe 521 for introducing the adhesive paste in the paste tank 520 to the paste supply nozzle 517, a flow regulator 522 provided midway of the pipe 521, an air under pressure pipe 523 for supplying air under pressure to the paste tank 520 and a selector valve 524 having two ports for supplying the air under pressure to the paste tank 520 through one port or releasing the air under pressure in the paste tank 520 through the other port. When the air under pressure is supplied to the paste tank 520 by way of the selector valve 524, the adhesive paste in the paste tank 520 is supplied to the paste supply nozzle 517 owing to the air under pressure while the adhesive paste is prevented from supplying to the paste supply nozzle 517 when the air under pressure is released from the paste tank 520. The selector valve 524 is an automatic operating valve of an electromagnetic type or a pneumatic type and it is controlled by a controller 525 when it is open or closed. The flow regulator 522 is of a manual operating type.

There is a level detecting means 526 which is disposed over the adhesive paste 514 stored in the adhesive tray 511 for detecting the level of the adhesive paste in the paste tray 511. It is possible to selectively use known sensors such as an optical sensor, a supersonic wave sensor, an electrostatic sensor, etc. as the level detecting means 526. The signal issued by the level detecting means 526 is supplied to the controller 525 which uses the same signal for controlling the selector valve 524. The controller 525 is structured to perform the ON-OFF control action in the manner that the selector valve 524 is open for supplying the air under pressure to the paste tank 520 when the level of the adhesive paste in the paste tray 511 is lower than a given low level while the selector valve 524 is closed for releasing the air under pressure in the paste tank 520 when the level of the adhesive paste 514 in the paste tray 511 is higher than a given high level.

An operation of the pasting device having the arrangement set forth above will be described hereinafter. The adhesive paste 514 is always stored in the paste tray 511. At this state, the paste supply roller 503 is rotated in the direction of the arrow C whereby the adhesive paste having a given thickness restricted by the doctor 512 is stuck to a peripheral surface of the paste supply roller 503 and drawn out, the so drawn out adhesive paste is supplied to the convex portion 502a of the cylinder roller 502 which is rotated in the direction of the arrow B and the convex portion 502a applies the adhesive paste having the given thickness to the object 501 to be pasted which passes under the cylinder roller 502 in the direction of the arrow A. As a result, the adhesive paste having the given thickness is applied to the object 501 to be pasted.

When the adhesive paste is applied to the object 501, the adhesive paste in the paste tray 511 is lowered as it is consumed. When the level is lower than the given low level, it is detected by the level detecting means 526 which issues a signal based on which the controller 525 closes the selector valve 524 to thereby release the air under pressure in the paste tank 520. As a result, the supply of the paste is stopped. In such a manner, the supply of the adhesive paste from the paste tank 520 to the paste tray 511 is under the ON-OFF control action whereby the amount of the adhesive paste in the paste tray 511 is always kept constant. As a result, the troublesome monitoring operation by an operator is omitted. Although the flow of the adhesive paste from the paste supply nozzle 517 continues or stops during the control operation by the controller, the paste supply nozzle 517 is not likely clogged owing to the dryness of the adhesive paste since the tip end of the paste supply nozzle 517 is soaked into the adhesive paste 514 and does not contact air. The flow regulator 522 may be regulated so as to be adapted for supplying the adhesive paste by performing the ON-OFF control action. The flow regulator 522 is not necessary to be reregulated even if the property of the adhesive paste is changed as the time lapses. That is, even if the property of the adhesive paste is changed and the flow of the adhesive paste is varied to some extent, merely the ON-time and the OFF-time are varied during the performance of the ON-OFF control action so that the level of the adhesive paste in the paste tray 511 can be controlled without any obstacle.

According to this embodiment, air under pressure is used as the paste supply means and the supply of the air under pressure to be supplied to the paste tank is controlled. However, the present invention is not limited to this arrangement but can be variously changed. For example, the air under pressure is always supplied to the paste tank and the passage from the paste tank to the paste supply nozzle may be intermittently controlled. The air under pressure may be replaced by another fluid under pressure. Furthermore, a pump is used instead of the air under pressure for supplying the adhesive paste and the operation of the pump is under the ON-OFF control action or the passage from the pump to the paste supply nozzle may be intermittently controlled. The control of the supply of the adhesive paste to the paste supply nozzle is not always under the ON-OFF control action in a strict sense wherein the amount of the flow of the adhesive paste becomes zero under the OFF control action but it may be replaced by the switching system to selectively switch to the large amount of the flow or small amount of the flow. Still furthermore, a system may be adopted for continuously controlling the amount of the adhesive paste in response to the speed of machine instead of ON-OFF control action for supplying the adhesive paste to the paste supply nozzle, that is, the control system for varying the amount of supply of the adhesive paste in response to the speed of machine, e,g., the amount of supply of the adhesive paste is varied in response to the speed of the machine by varying the air under pressure to be supplied to the paste tank in response to the speed of the machine. In the latter case, the signal issued by the level detecting means may be used as a control signal for use an emergency stop or the emergency supply of the adhesive paste when the level of the adhesive paste in the paste tray rises or lowers anomalously.

As mentioned above in detail, according to the pasting device of this ninth embodiment, the level of the adhesive paste in the paste tray is detected by the level detecting means and the amount of the adhesive paste to be supplied to the paste supply nozzle is controlled based on the signal issued by the level detecting means whereby the amount of the adhesive paste in the paste tray may be kept within a given value. As a result, a troublesome monitoring operation or the regulating operation by the operator may be omitted. Furthermore, since the tip end of the paste supply nozzle is soaked into the paste tray, the amount of flow in the paste supply nozzle is increased or decreased, the paste supply nozzle is not clogged by the adhesive paste whereby the ON-OFF control action can be performed and an automation can be easily made by such an simple ON-OFF control mechanism.

When the paste supply roller is disposed in front of the cylinder roller, the ahesive paste which is scattered when the paste supply roller is moved away from the convex portion of the cylinder roller is scattered in the direction opposite to the object to be pasted or the conveying means whereby the object to be pasted or the conveying means are not contaminated.

What is claimed:

1. A method of attaching a nonmetallic cutter to a carton comprising the steps of:
   feeding intermittently a nonmetallic sheet by a feeding means toward upper and lower molds, one of which is vertically movable;
   punching the nonmetallic sheet by said upper and lower molds to form a cutter;
   conveying and setting cartons one by one by a conveying means;
   pressing the cutter to one of said cartons at a given position of the carton by way of an adhesive paste applied to the cutter while the cutter is sucked and held by said movable upper or lower mold; and
   said nonmetallic sheet including said adhesive paste on one side thereof and a removable sheet overlying said adhesive paste, said method further including the step of peeling said removable sheet to expose said adhesive paste prior to said punching by said upper and lower molds.

2. A method according to claim 1, wherein said feeding step includes the step of moving said nonmetallic sheet so that an end of said nonmetallic sheet protrudes beyond a first cutting blade of one of said upper and lower molds to define said cutter, said punching step including the step of moving a second cutting blade of the other of said upper and lower molds vertically into engagement with said first cutting blade to sever said cutter from said nonmetallic sheet, and vertically moving said cutter toward said carton for said pressing of said cutter onto said carton.

3. A method of attaching a nonmetallic cutter to a carton comprising the steps of:

feeding intermittently a nonmetallic sheet by a feeding means toward upper and lower molds, one of which is vertically movable;

punching the nonmetallic sheet by said upper and lower molds to form a cutter;

conveying and setting cartons one by one by a conveying means;

pressing the cutter to one of said cartons at a given position of the carton by way of an adhesive paste applied to the cutter while the cutter is sucked and held by said movable upper or lower mold; and said feeding step includes the step of moving said nonmetallic sheet so that an end of said nonmetallic sheet protrudes beyond a first cutting blade of one of said upper and lower molds to define said cutter, said punching step including the step of moving a second cutting blade of the other of said upper and lower molds vertically into engagement with said first cutting blade to sever said cutter from said nonmetallic sheet, and vertically moving said cutter toward said carton for said pressing of said cutter onto said carton.

4. A method according to claim 3, wherein said nonmetallic sheet has a separable peeling means pasted thereto.

5. A method according to claim 3, wherein said nonmetallic cutter has a separable peeling means pasted thereto.

6. A method of attaching a nonmetallic cutter to a carton comprising the steps of:

feeding a nonmetallic sheet toward a first mold so that a portion of said nonmetallic sheet protrudes beyond a first cutting blade of said first mold, said first cutting blade being disposed on a first side of said nonmetallic sheet;

providing a second mold proximate said first mold on a second side of said nonmetallic sheet which is opposite said first side;

moving a second cutting blade of said second mold toward said first cutting blade so as to sever said portion of said nonmetallic sheet to form a nonmetallic cutter;

holding said cutter on said second mold;

conveying and setting a carton proximate said first and second molds;

pressing said cutter onto said carton by moving said second mold toward said carton; and said second mold including vacuum means for said holding of said cutter and for releasing said cutter after said cutter is pressed onto said carton, said holding step including the step of applying suction to said second side by said vacuum means.

7. A method according to claim 6, wherein said cutter includes an adhesive paste on said first side which adheres to said carton during said pressing.

8. A method according to claim 7, wherein said nonmetallic sheet includes said adhesive paste and a removable sheet overlying said adhesive paste, said method further including the step of peeling said removable sheet from said nonmetallic sheet prior to said severing of said cutter.

9. A method according to claim 6, further including the step of applying an adhesive to at least one of said carton and said cutter prior to said pressing step so that said adhesive connects opposing surfaces of said cutter and said carton together after said pressing.

10. A method according to claim 6, wherein said nonmetallic sheet includes attachment means on said first side thereof for attaching said cutter to said carton during said pressing, and a removable sheet overlying said attachment means, said method further including the step of removing said removable sheet from said portion of said non-metallic cutter which defines said cutter prior to said pressing of said cutter on said carton.

11. A method of attaching a nonmetallic cutter to a carton comprising the steps of:

feeding a nonmetallic sheet toward a first mold so that a portion of said nonmetallic sheet protrudes beyond a first cutting blade of said first mold, said first cutting blade being disposed on a first side of said nonmetallic sheet;

providing a second mold proximate said first mold on a second side of said nonmetallic sheet which is opposite said first side;

moving a second cutting blade of said second mold toward said first cutting blade so as to sever said portion of said nonmetallic sheet to form a nonmetallic cutter;

holding said cutter on said second mold;

conveying and setting a carton proximate said first and second molds;

pressing said cutter onto said carton by moving said second mold toward said carton; and said non-metallic sheet including attachment means on said first side thereof for attaching said cutter to said carton during said pressing, and a removable sheet overlying said attachment means, said method further including the step of removing said removable sheet from said portion of said non-metallic cutter which defines said cutter prior to said pressing of said cutter on said carton.

12. A method according to claim 11, further including the steps of releasing said cutter from said second mold after said pressing onto said carton, and thereafter removing said carton.

13. A method according to claim 12, wherein said method is repeated intermittently after each said carton is removed so as to form a plurality of said cutters from said nonmetallic sheet which are pressed onto a respective plurality of said cartons.

14. A method according to claim 11, wherein said feeding of said non-metallic sheet is in a feed direction and said moving of said second cutting blade is in a cutting direction oriented transverse to said feed direction.

15. A method according to claim 11, further including the steps of engaging teeth-shaped edges of said first and second cutting blades together during said moving to form said cutter with a corresponding teeth-shaped edge when said cutter is severed.

16. A method according to claim 15, wherein said pressing step positions said teeth-shaped edge proximate an edge of said carton.

* * * * *